United States Patent
Tsai et al.

(10) Patent No.: US 9,733,454 B2
(45) Date of Patent: Aug. 15, 2017

(54) PHOTOGRAPHING OPTICAL LENS ASSEMBLY, IMAGING DEVICE AND MOBILE TERMINAL

(71) Applicant: LARGAN PRECISION CO., LTD., Taichung (TW)

(72) Inventors: Tsung-Han Tsai, Taichung (TW); Hsin-Hsuan Huang, Taichung (TW)

(73) Assignee: LARGAN PRECISION CO., LTD. (TW)

( * ) Notice: Subject to any disclaimer, the term of this patent is extended or adjusted under 35 U.S.C. 154(b) by 0 days.

(21) Appl. No.: 15/052,778

(22) Filed: Feb. 24, 2016

(65) Prior Publication Data

US 2016/0170184 A1 Jun. 16, 2016

Related U.S. Application Data

(63) Continuation of application No. 14/464,705, filed on Aug. 21, 2014, now Pat. No. 9,310,587.

(51) Int. Cl.
| | |
|---|---|
| *G02B 13/18* | (2006.01) |
| *G02B 13/00* | (2006.01) |
| *G02B 9/60* | (2006.01) |
| *G02B 9/00* | (2006.01) |
| *G02B 27/00* | (2006.01) |
| *H04N 5/225* | (2006.01) |

(52) U.S. Cl.
CPC ......... *G02B 13/0045* (2013.01); *G02B 9/00* (2013.01); *G02B 9/60* (2013.01); *G02B 13/18* (2013.01); *G02B 27/0025* (2013.01); *H04N 5/2253* (2013.01)

(58) Field of Classification Search
CPC ... G02B 9/00; G02B 9/60; G02B 9/62; G02B 9/64; G02B 13/18
USPC ............... 359/714, 754–757, 763, 764, 766
See application file for complete search history.

(56) References Cited

U.S. PATENT DOCUMENTS

| | | | |
|---|---|---|---|
| 6,867,933 B2 | 3/2005 | Matsusaka | |
| 8,000,031 B1 * | 8/2011 | Tsai | ............... G02B 13/0045 359/714 |
| 8,248,713 B2 | 8/2012 | Hsieh et al. | |
| 8,395,853 B2 | 3/2013 | Chen et al. | |
| 8,576,497 B2 | 11/2013 | Hsu et al. | |

(Continued)

FOREIGN PATENT DOCUMENTS

| | | |
|---|---|---|
| CN | 203101713 U | 7/2013 |
| JP | 2014178624 A | 9/2014 |

*Primary Examiner* — William R Alexander
(74) *Attorney, Agent, or Firm* — Bruce Stone LLP; Joseph Bruce

(57) ABSTRACT

A photographing optical lens assembly comprises, in order from an object side to an image side: a first lens element, a second lens element, a third lens element, a fourth lens element and a fifth lens element. The first lens element with refractive power has a concave object-side surface in a paraxial region. The second lens element has refractive power. The third lens element has refractive power. The fourth lens element with negative refractive power has an object-side and an image-side surfaces both being aspheric. The fifth lens element with refractive power has an aspheric object-side surface and an aspheric image-side surface being concave in a paraxial region with at least one inflection point. The photographing optical lens assembly has a total of five lens elements with refractive power.

28 Claims, 18 Drawing Sheets

(56) References Cited

U.S. PATENT DOCUMENTS

| | | | |
|---|---|---|---|
| 8,675,289 B2 * | 3/2014 | Tsai | G02B 13/0045 359/708 |
| 8,705,181 B2 * | 4/2014 | Hsu | G02B 13/0045 359/714 |
| 2013/0114151 A1 * | 5/2013 | Chen | G02B 13/0045 359/714 |
| 2013/0314803 A1 * | 11/2013 | Huang | G02B 13/00 359/714 |
| 2014/0002909 A1 * | 1/2014 | Yonezawa | G02B 13/0045 359/714 |
| 2014/0198396 A1 * | 7/2014 | Hsu | G02B 13/0045 359/714 |

* cited by examiner

PHOTOGRAPHING OPTICAL LENS ASSEMBLY, IMAGING DEVICE AND MOBILE TERMINAL

RELATED APPLICATIONS

This application is a continuation of U.S. patent application Ser. No. 14/464,705, filed on Aug. 21, 2014, which claims priority to Taiwan Application Serial Number 103124084, filed on Jul. 14, 2014. The entire disclosures of both applications are hereby incorporated by reference herein.

BACKGROUND

Technical Field

The present disclosure relates to a photographing optical lens assembly, imaging device and mobile terminal. More particularly, the present disclosure relates to a compact photographing optical lens assembly and imaging device applicable to a mobile terminal.

Description of Related Art

Due to the progress of science and technology, compact size has become the trend of modern electronic devices, such as, digital still camera, web camera, mobile phone camera, etc. In addition to the requirements of keeping a compact size and low cost, consumers also demand the optical lens assembly with better aberration correcting ability, high resolution and better image quality.

A conventional compact photographing optical lens assembly in an electronic device typically utilizes a two-element, three-element, four-element or five-element lens structure. However, in consideration of image quality, the four-element and five-element lens structures have the superiority in aberration correcting and image resolution.

As to the conventional five-element lens structure, the object-side surface of the first lens element is convex, which cannot prevent possible damage to the lens when the lens surface is exposed to the environment, thus decreasing the imaging quality. The fourth lens element is positive refractive power, which cannot extend the effective range of lens via the divergent light beam of the whole system. In addition, without having the bi-aspheric design of the fourth and fifth lens elements, it cannot obtain the high order aspherical coefficient for optimal performance, so that peripheral aberrations, such as, astigmatism and distortion, cannot be corrected effectively.

SUMMARY

The primary objective of the present disclosure is to mitigate and/or obviate the afore-mentioned disadvantages by providing a photographing optical lens assembly comprising a first lens element with a concave object-side surface, which can prevent possible damage to the lens when the lens surface is exposed to the environment, so as to avoid decreasing the imaging quality.

Additionally, a photographing optical lens assembly with the fourth lens element being negative, which can extend the effective range of lens via the divergent beam of the whole system, and the bi-aspheric design of the fourth and fifth lens elements can obtain the high order aspherical coefficient for optimal performance, so as to correct peripheral aberrations, such as, astigmatism and distortion, effectively.

According to one aspect of the present disclosure, a photographing optical lens assembly comprises, in order from an object side to an image side, a first lens element having an object-side surface being concave in a paraxial region, a second lens element, a third lens element, a fourth lens element with negative refractive power having an aspheric object-side surface and an aspheric image-side surface, a fifth lens element having an aspheric object-side surface and an aspheric image-side surface being concave in a paraxial region and at least one inflection point. An axial distance between the first lens element and the second lens element is shorter than an axial distance between the second lens element and the third lens element. The photographing optical lens assembly has a total of five lens elements with refractive power. A curvature radius of the image-side surface of the fifth lens element is R10, a focal length of the fourth lens element is f4, an axial distance between the object-side surface of the first lens element and an image surface is TL, and a maximum image height of the photographing optical lens assembly is ImgH, the following conditions are satisfied:

$-2.0 < R10/f4 < 0$; and $TL/ImgH < 2.5$.

According to another aspect of the present disclosure, an imaging device includes the photographing optical lens assembly according to the aforementioned aspect and an image sensor, wherein the image sensor is disposed on an image side of the photographing optical lens assembly.

According to still another aspect of the present disclosure, a mobile terminal includes the imaging device according to the aforementioned aspect.

According to still another aspect of the present disclosure, a photographing optical lens assembly comprises, in order from an object side to an image side, a first lens element with positive refractive power having an object-side surface being concave in a paraxial region and an image-side surface being convex in a paraxial region, a second lens element having an image-side surface being concave in a paraxial region, a third lens element, a fourth lens element with negative refractive power having an aspheric object-side surface and an aspheric image-side surface, a fifth lens element having an aspheric object-side surface and an aspheric image-side surface being concave in a paraxial region and at least one inflection point. The photographing optical lens assembly has a total of five lens elements with refractive power. A curvature radius of the image-side surface of the fifth lens element is R10, a focal length of the fourth lens element is f4, an axial distance between the object-side surface of the first lens element and an image surface is TL, a maximum image height of the photographing optical lens assembly is ImgH, a curvature radius of the object-side surface of the first lens element is R1, and a curvature radius of the image-side surface of the first lens element is R2, the following conditions are satisfied:

$-2.0 < R10/f4 < 0$;

$TL/ImgH < 2.5$; and $1.00 < (R1+R2)/(R1-R2) < 3.00$.

When R10/f4 satisfies the condition, it is favorable for extending the effective range of lens via the divergent beam of the whole system. In addition, the bi-aspheric design of the fourth and fifth lens elements can obtain the high order aspherical coefficient for optimal performance, so as to correct peripheral aberrations, such as, astigmatism and distortion, effectively.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
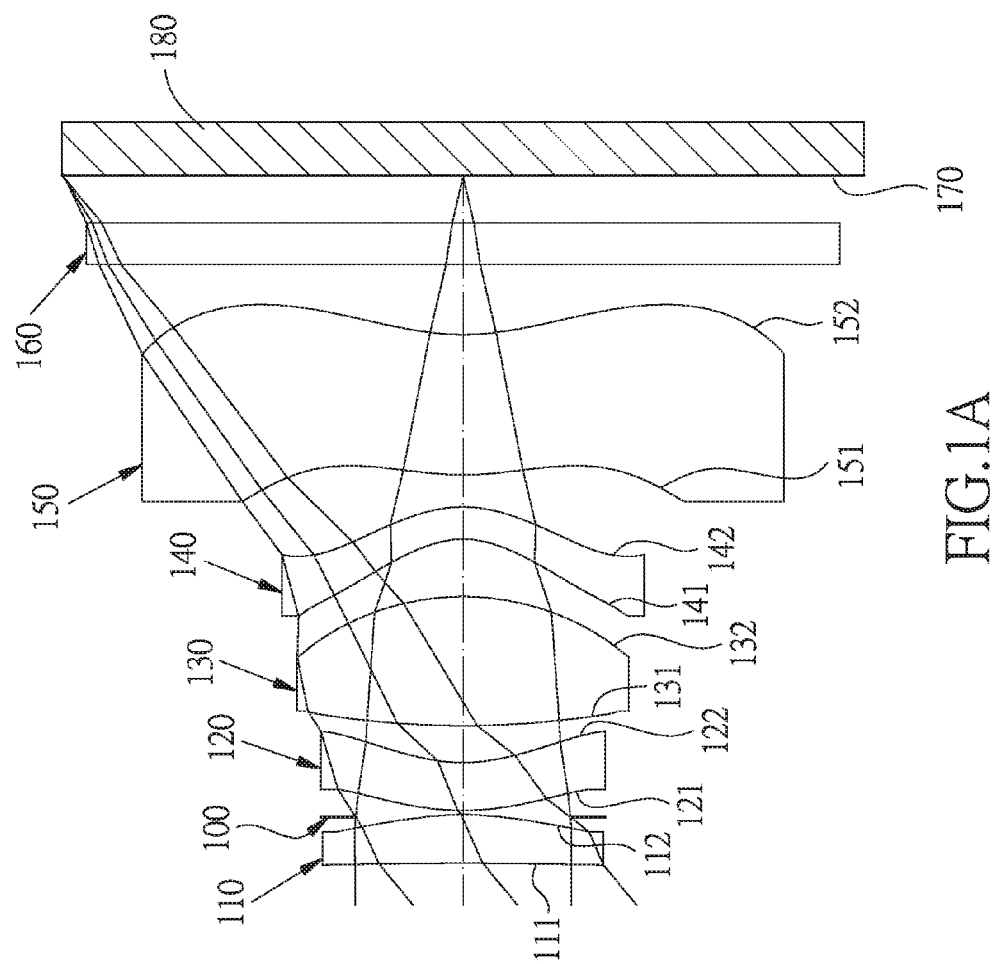
FIG. 1A is a schematic view of an imaging device according to the 1st embodiment of the present disclosure.

A photographing optical lens assembly comprises, in order from an object side to an image side, a first lens element, a second lens element, a third lens element, a fourth lens element and a fifth lens element. An axial distance between the first lens element and the second lens element is shorter than an axial distance between the second lens element and the third lens element. The photographing optical lens assembly has a total of five lens elements with refractive power. Therefore, it is favorable for controlling the back focal length of the photographing optical lens assembly.

The first lens element has an object-side surface being concave in a paraxial region. Therefore, it can prevent possible damage to the lens when the lens surface is exposed to the outside environment, so as to avoid decreasing the imaging quality.

The fourth lens element with negative refractive power has an aspheric object-side surface and an aspheric image-side surface, and the fifth lens element has an aspheric object-side surface and an aspheric image-side surface. In addition, the bi-aspheric design of the fourth and fifth lens elements can obtain the high order aspherical coefficient for optimal performance, so as to correct peripheral aberrations, such as, astigmatism and distortion, effectively.

According to the photographing optical lens assembly of the present disclosure, the fifth lens element has the image-side surface being concave in a paraxial region and at least one inflection point. Therefore, it will contribute to a better correction of the incident angle of the off-axis light with respect to the image sensor, and can further correcting the off-axis aberration.

When a curvature radius of the image-side surface of the fifth lens element is R10, and a focal length of the fourth lens element is f4, the following condition can be satisfied: $-2.0<R10/f4<0$, which can extend the effective range of lens via the divergent beam of the whole system.

When an axial distance between the object-side surface of the first lens element and an image surface is TL, and a maximum image height of the photographing optical lens assembly is ImgH, the following condition is satisfied: $TL/ImgH<2.5$. Preferably, the following condition can be satisfied: $TL/ImgH<2.0$, which can keep a compact size thereof.

According to the photographing optical lens assembly of the present disclosure, the first lens element can have an image-side surface being convex in a paraxial region. Therefore, it is favorable for correcting the astigmatism of the photographing optical lens assembly.

According to the photographing optical lens assembly of the present disclosure, the fifth lens element can have the object-side surface being convex in a paraxial region. Therefore, it is favorable for further correcting the astigmatism and high order aberrations of the photographing optical lens assembly.

According to the photographing optical lens assembly of the present disclosure, the third lens element can have positive refractive power. Therefore, the refractive power of the photographing optical lens assembly can be favorably distributed.

According to the photographing optical lens assembly of the present disclosure, the third lens element can have an image-side surface being convex in a paraxial region. Therefore, it is favorable for correcting the aberration of the photographing optical lens assembly.

According to the photographing optical lens assembly of the present disclosure, half of a maximal field of view of the photographing optical lens assembly is HFOV, the following condition can be satisfied: 35 degrees<HFOV<55 degrees. Therefore, it is favorable for obtaining large field of view for the photographing optical lens assembly.

According to the photographing optical lens assembly of the present disclosure, the first lens element can have positive refractive power. Therefore, it is favorable for reducing the total track length of the photographing optical lens assembly.

According to the photographing optical lens assembly of the present disclosure, the fourth lens element can have the object-side surface being concave in a paraxial region and the image-side surface being convex in a paraxial region. Therefore, it is favorable for correcting the astigmatism and high order aberrations of the photographing optical lens assembly.

According to the photographing optical lens assembly of the present disclosure, a central thickness of the fourth lens element is CT4, a central thickness of the fifth lens element is CT5, and the following condition can be satisfied: $0<CT4/CT5<0.60$. Therefore, it is favorable for avoiding the lens thickness being excessively thin or thick as well as being easily crackled or deformed during the manufacturing process. It is thereby favorable for assembling and arranging the lens elements of the photographing optical lens assembly.

According to the photographing optical lens assembly of the present disclosure, a curvature radius of an object-side surface of the second lens element is R3, a curvature radius of an image-side surface of the second lens element is R4, a curvature radius of the object-side surface of the fourth lens element is R7, a curvature radius of the image-side surface of the fourth lens element is R8, a curvature radius of the object-side surface of the fifth lens element is R9, the curvature radius of the image-side surface of the fifth lens element is R10, a shape factor of the second lens element is SF2, a shape factor of the fourth lens element is SF4, and a shape factor of the fifth lens element is SF5, the following conditions can be satisfied: $SF2=(R3+R4)/(R3-R4)$; $SF4=(R7+R8)/(R7-R8)$; $SF5=(R9+R10)/(R9-R10)$; $0<|1/SF2|+|1/SF4|+|1/SF5|<0.90$. Therefore, it is favorable for controlling distortion and spherical aberration while reducing the lens molding and manufacturing difficulty.

According to the photographing optical lens assembly of the present disclosure, the photographing optical lens assembly further includes a stop, wherein an axial distance between the stop and the image-side surface of the fifth lens element is SD, and an axial distance between the object-side surface of the first lens element and the image-side surface of the fifth lens element is TD, the following condition can be satisfied: $0.85<SD/TD<1.2$. Therefore, it is favorable for balancing between the telecentricity and wide-angle functionality.

According to the photographing optical lens assembly of the present disclosure, the object-side surface of the fourth lens element can have the largest curvature among the first, second, third, fourth and fifth lens elements (such a curvature is a scalar quantity and has no positive or negative state). Therefore, it is favorable for correcting the astigmatism and high order aberrations of the photographing optical lens assembly.

According to the photographing optical lens assembly of the present disclosure, a vertical distance between an off-axis tangential point of a tangent vertical to an optical axis on the image-side surface of the fifth lens element and the optical axis of the photographing optical lens assembly is Yc52, a curvature radius of the object-side surface of the first lens element is R1, the following condition can be satisfied: $-0.5<Yc52/R1<0$. Therefore, the effective range will be relatively large and it is favorable for further correcting peripheral aberrations within the assembly.

According to the photographing optical lens assembly of the present disclosure, an axial distance between the first lens element and the second lens element is T12, and an axial distance between the second lens element and the third lens element is T23, the following condition can be satisfied: $0<T12/T23<0.80$. Therefore, the second lens element arrangement will be more proper, and it is favorable for correcting the aberration of the photographing optical lens assembly.

According to the photographing optical lens assembly of the present disclosure, the curvature radius of the object-side surface of the first lens element is R1, and the focal length of the fourth lens element is f4, the following condition can be satisfied: $-7.0<Log(R1/f4)<7.0$. Therefore, it is favorable for controlling the curvature of the object-side surface of the first lens element and providing suitable negative refractive power.

According to the present disclosure, an imaging unit is provided. The imaging unit includes the photographing optical lens assembly according to the aforementioned photographing optical lens assembly of the present disclosure, and an image sensor, wherein the image sensor is disposed on the image side of the aforementioned photographing optical lens assembly, that is, the image sensor can be disposed on or near an image surface of the aforementioned photographing optical lens assembly. The image surface of the photographing optical lens assembly can be a plane or a curved surface with any curvature according to the corresponding the image sensor, especially the curved surface with a concave surface towards an object-side direction. It is thereby favorable for obtaining large field of view for the imaging unit and keeping a compact size thereof. Preferably, the imaging unit can further include a barrel member, a holding member or a combination thereof.

According to the present disclosure, a mobile terminal is provided, wherein the mobile terminal includes the aforementioned imaging unit. Preferably, the mobile terminal can further include but not limited to display, control unit, random access memory unit (RAM), storage unit or a combination thereof.

Figure 11:
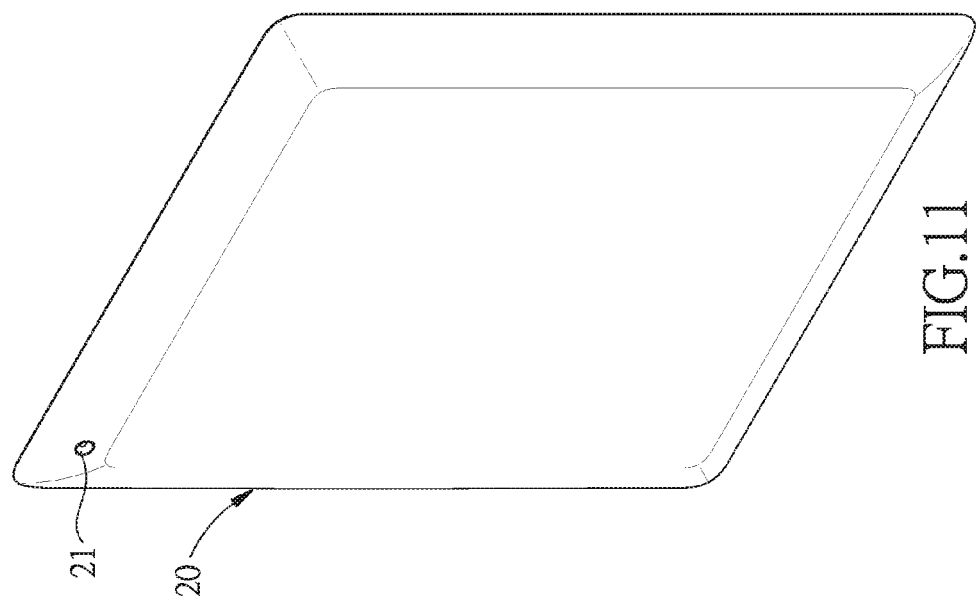
FIG. 11 shows a mobile terminal according to the 10th embodiment.
Figure 10:
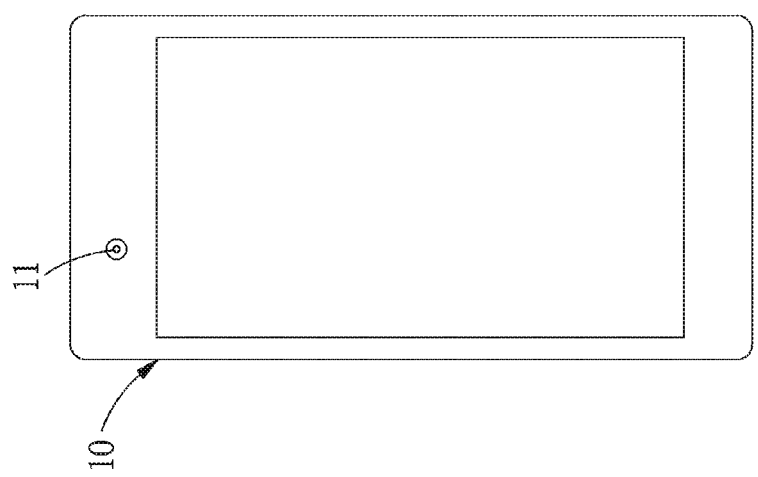
FIG. 10 shows a mobile terminal according to the 9th embodiment.

In FIG. 10 and FIG. 11, an imaging device 11, 21 may be installed in, but not limited to, a smart phone 10 (FIG. 10) or a tablet computer 20 (FIG. 11). The two exemplary figures of different kinds of mobile terminals are only exemplary for showing the imaging device 11, 21 of present disclosure installed in a mobile terminal and are not limited thereto.

Another photographing optical lens assembly comprises, in order from an object side to an image side, a first lens element, a second lens element, a third lens element, a fourth lens element and a fifth lens element. The photographing optical lens assembly has a total of five lens elements with refractive power.

The first lens element with positive refractive power has an object-side surface being concave in a paraxial region and an image-side surface being convex in a paraxial region.

Therefore, it can prevent possible damage to the lens when the lens surface is exposed to the outside environment, so as to avoid decreasing the imaging quality. It can further correcting the off-axis aberration and supplying the refractive power in the photographing optical lens assembly, so it is favorable for reducing the total track length of the photographing optical lens assembly.

The second lens element has an image-side surface being concave in a paraxial region. Therefore, it is favorable for correcting the peripheral ray and improving the peripheral image resolution of the photographing optical lens assembly.

The third lens element has refractive power, and the fourth lens element with negative refractive power has an aspheric object-side surface and an aspheric image-side surface.

The fifth lens element has an aspheric object-side surface and an aspheric concave image-side surface in a paraxial region, and the fifth lens element has at least one inflection point on the image-side surface. In addition, the bi-aspheric design of the fourth and fifth lens elements can obtain the high order aspherical coefficient for optimal performance, so as to correct peripheral aberrations, such as, astigmatism and distortion, effectively. Therefore, it will contribute to a better correction of the incident angle of the off-axis light with respect to the image sensor, and can further correcting the off-axis aberration.

When a curvature radius of the image-side surface of the fifth lens element is R10, and a focal length of the fourth lens element is f4, the following condition is satisfied: $-2.0<\text{R}10/\text{f}4<0$. Preferably, the following condition can be satisfied: $-0.80<\text{R}10/\text{f}4<0$, which can extend the effective range of lens via the divergent beam of the whole system.

When an axial distance between the object-side surface of the first lens element and an image surface is TL, and a maximum image height of the photographing optical lens assembly is ImgH, the following condition is satisfied: $\text{TL}/\text{ImgH}<2.5$, which can keep a compact size thereof.

When a curvature radius of the object-side surface of the first lens element is R1, and a curvature radius of the image-side surface of the first lens element is R2, the following condition is satisfied: $1.00<(\text{R}1+\text{R}2)/(\text{R}1-\text{R}2)<3.00$. Preferably, the following condition can be satisfied: $1.00<(\text{R}1+\text{R}2)/(\text{R}1-\text{R}2)<2.00$. Therefore, it is favorable for reducing the total track length of the photographing optical lens assembly.

According to the photographing optical lens assembly of the present disclosure, the second lens element can have negative refractive power. Therefore, it is favorable for correcting the aberration caused by the first lens element with positive refractive power. The first through fifth lens elements are non-cemented lens elements. The manufacturing process of the cemented lenses is more complex than the non-cemented lenses. In particular, a second surface of one lens element and a first surface of the following lens element need to have accurate curvature to ensure these two lens elements will be precisely matched when fitting by the cementing process. However, during the cementing process, those two lens elements might not be well cemented resulting in displacement between surfaces, and it is thereby not favorable in producing higher image quality of the photographing optical lens assembly. Therefore, the photographing optical lens assembly of the present disclosure provides five non-cemented lens elements for improving upon the problem generated by the cemented lens elements.

According to the photographing optical lens assembly of the present disclosure, one of an object-side and the image-side surfaces of the second lens element can have at least one inflection point, and one of the object-side and image-side surfaces of the fourth lens element can have at least one inflection point. Therefore, it can further correcting the off-axis aberration.

According to the photographing optical lens assembly of the present disclosure, an Abbe number of the second lens element is V2, an Abbe number of the fourth lens element is V4, and an Abbe number of the fifth lens element is V5, the following condition can be satisfied: $0.5<(\text{V}2+\text{V}4)/\text{V}5<1.0$. Therefore, it is favorable for correcting the aberration of the photographing optical lens assembly.

According to the photographing optical lens assembly of the present disclosure, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition can be satisfied: $0<(\text{T}12+\text{T}45)/(\text{T}23+\text{T}34)<0.5$. Therefore, it can further reduce the total track length of the photographing optical lens assembly so as to keep the optical photographing lens assembly compact.

According to the photographing optical lens assembly of the present disclosure, the photographing optical lens assembly further includes a stop, wherein the stop is located closer to the object side than the second lens element. Therefore, it is favorable for enlarging the field of view of the photographing optical lens assembly and thereby provides a wider field of view for the same. The stop can also be disposed between the imaged object and the first lens element, which can provide a longer distance between an exit pupil of the photographing optical lens assembly and the image surface and thereby improves the image-sensing efficiency of an image sensor.

According to the photographing optical lens assembly of the present disclosure, a focal length of the first lens element is f1, and a focal length of the third lens element is f3, the following condition can be satisfied: $0<\text{f}3/\text{f}1<1.5$. Therefore, it is favorable for controlling the refractive power of the first and third lens elements, so as to avoid causing excessive aberrations.

According to the photographing optical lens assembly of the present disclosure, a central thickness of the first lens element is CT1, a central thickness of the second lens element is CT2, a central thickness of the third lens element is CT3, a central thickness of the fourth lens element is CT4, and a central thickness of the fifth lens element is CT5, the following condition can be satisfied: $(\text{CT}1+\text{CT}2+\text{CT}4)/(\text{CT}3+\text{CT}5)<0.70$. Therefore, it is favorable for maintaining the compactness and homogeneity of the lens elements during the plastic injection molding process as well as avoiding the lens thickness being excessively thin or thick. It is thereby favorable for assembling the lens elements of the photographing optical lens assembly and improving the image quality.

According to the photographing optical lens assembly of the present disclosure, the fourth lens element can have the object-side surface being concave in a paraxial region and the image-side surface being convex in a paraxial region, and the fifth lens element can have the object-side surface being convex in a paraxial region. Therefore, it is favorable for further correcting the astigmatism and high order aberrations of the photographing optical lens assembly.

According to the photographing optical lens assembly of the present disclosure, an effective radius of the object-side surface of the first lens element is Y11, and an effective radius of the image-side surface of the fifth lens element is Y52, the following condition can be satisfied: $0<\text{Y}11/\text{Y}52<0.60$. Therefore, the entrance pupil and exit pupil of the photographing optical lens assembly will be more proper, it is favorable for controlling the stray light and thereby improving the image quality.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, the photographing optical lens assembly can include at least one stop, such as an aperture stop, a glare stop or a field stop. The glare stop or the field stop is for eliminating the stray light and thereby improving the image resolution thereof.

According to the photographing optical lens assembly of the present disclosure, each of an object-side surface in the paraxial region and an image-side surface has a paraxial region and an off-axis region. The paraxial region refers to the region of the surface close to the optical axis, and the off-axis region refers to the region of the surface away from the optical axis. Particularly, when the lens element has a convex surface, it indicates that the surface is convex in the paraxial region; when the lens element has a concave surface, it indicates that the surface is concave in the paraxial region. When location of the refractive power or the focal length of the lens element is not defined, it indicates that such a refractive power or focal length is the refractive power or focal length in the paraxial region.

The present photographing optical lens assembly can be optionally applied to moving focus optical systems. According to the photographing optical lens assembly of the present disclosure, the photographing optical lens assembly is featured with good correction ability and high image quality, and can be applied to 3D (three-dimensional) image capturing applications, in products such as digital cameras, mobile devices, digital tablets, wearable devices and other electronic devices.

According to the above description of the present disclosure, the following 1st-10th specific embodiments are provided for further explanation.

1st Embodiment

Figure 1B:
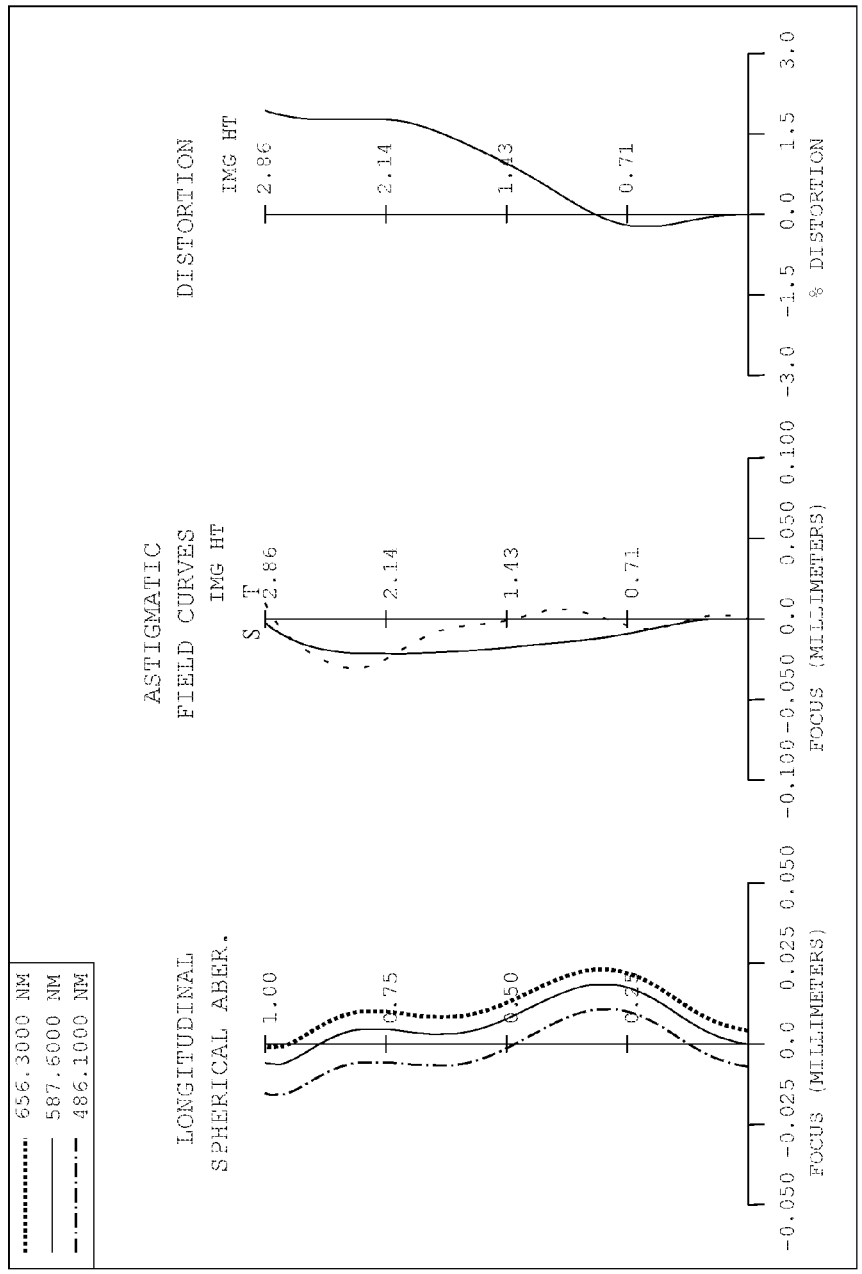
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging unit according to the 1st embodiment.

In FIG. 1A, the imaging device includes the photographing optical lens assembly (not otherwise herein labeled) of the present disclosure and an image sensor 180. The photographing optical lens assembly comprises, in order from an object side to an image side, a first lens element 110, an aperture stop 100, a second lens element 120, a third lens element 130, a fourth lens element 140, a fifth lens element 150, an IR-cut filter 160 and an image surface 170, wherein the photographing optical lens assembly has a total of five non-cemented lens elements (110-150) with refractive power.

The first lens element 110 with positive refractive power has an aspheric object-side surface 111 being concave in a paraxial region and an aspheric image-side surface 112 being convex in a paraxial region, and the first lens element 110 is made of plastic material.

The second lens element 120 with negative refractive power has an aspheric object-side surface 121 being convex in a paraxial region and an aspheric image-side surface 122 being concave in a paraxial region, the second lens element 120 is made of plastic material, and inflection points are formed on the object-side surface 121 and the image-side surface 122 of the second lens element 120.

The third lens element 130 with positive refractive power has an aspheric object-side surface 131 being convex in a paraxial region and an aspheric image-side surface 132 being convex in a paraxial region, and the third lens element 130 is made of plastic material.

The fourth lens element 140 with negative refractive power has an aspheric object-side surface 141 being concave in a paraxial region and an aspheric image-side surface 142 being convex in a paraxial region, the fourth lens element 140 is made of plastic material, and inflection points are formed on the object-side surface 141 and the image-side surface 142 of the fourth lens element 140.

The fifth lens element 150 with negative refractive power has an aspheric object-side surface 151 being convex in a paraxial region and an aspheric image-side surface 152 being concave in a paraxial region, the fifth lens element 150 is made of plastic material, and inflection points are formed on the image-side surface 152 of the fifth lens element 150.

The IR-cut filter 160 is made of glass and located between the fifth lens element 150 and the image surface 170, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly of the imaging device according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.39 mm; Fno=2.20; and HFOV=39.5 degrees.

In the photographing optical lens assembly of the imaging device according to the 1st embodiment, when an Abbe number of the second lens element 120 is V2, an Abbe number of the fourth lens element 140 is V4, and an Abbe number of the fifth lens element 150 is V5, the following condition is satisfied: (V2+V4)/V5=0.84.

In the photographing optical lens assembly of the imaging device according to the 1st embodiment, when an axial distance between the first lens element 110 and the second lens element 120 is T12, and an axial distance between the second lens element 120 and the third lens element 130 is T23, the following condition is satisfied: T12/T23=0.11.

In the photographing optical lens assembly of the imaging device according to the 1st embodiment, when the axial distance between the first lens element 110 and the second lens element 120 is T12, the axial distance between the second lens element 120 and the third lens element 130 is T23, an axial distance between the third lens element 130 and the fourth lens element 140 is T34, and an axial distance between the fourth lens element 140 and the fifth lens element 150 is T45, the following condition is satisfied: (T12+T45)/(T23+T34)=0.38.

In the photographing optical lens assembly of the imaging device according to the 1st embodiment, when a central thickness of the fourth lens element 140 is CT4, and a central thickness of the fifth lens element 150 is CT5, the following condition is satisfied: CT4/CT5=0.23.

In the photographing optical lens assembly of the imaging device according to the 1st embodiment, when a central thickness of the first lens element 110 is CT1, a central thickness of the second lens element 120 is CT2, a central thickness of the third lens element 130 is CT3, the central thickness of the fourth lens element 140 is CT4, and the central thickness of the fifth lens element 150 is CT5, the following condition is satisfied: (CT1+CT2+CT4)/(CT3+CT5)=0.48.

In the photographing optical lens assembly of the imaging device according to the 1st embodiment, when a curvature radius of the object-side surface 111 of the first lens element 110 is R1, and a curvature radius of the image-side surface 112 of the first lens element 110 is R2, the following condition is satisfied: (R1+R2)/(R1−R2)=1.27.

In the photographing optical lens assembly of the imaging device according to the 1st embodiment, when a curvature radius of the image-side surface 152 of the fifth lens element 150 is R10, and a focal length of the fourth lens element 140 is f4, the following condition is satisfied: R10/f4=−0.32.

In the photographing optical lens assembly of the imaging device according to the 1st embodiment, when a focal length of the first lens element 110 is f1, and a focal length of the third lens element 130 is f3, the following condition is satisfied: f3/f1=0.58.

In the photographing optical lens assembly of the imaging device according to the 1st embodiment, when a curvature radius of the object-side surface 121 of the second lens element 120 is R3, a curvature radius of the image-side surface 122 of the second lens element 120 is R4, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, the curvature radius of the image-side surface 152 of the fifth lens element 150 is R10, a shape factor of the second lens element 120 is SF2, a shape factor of the fourth lens element 140 is SF4, and a shape factor of the fifth lens element 150 is SF5, the following conditions are satisfied: SF2=(R3+R4)/(R3−R4); SF4=(R7+R8)/(R7−R8); SF5=(R9+R10)/(R9−R10); |1/SF2|+|1/SF4|+|1/SF5|=0.49.

In the photographing optical lens assembly of the imaging device according to the 1st embodiment, when an effective radius of the object-side surface 111 of the first lens element 110 is Y11, and an effective radius of the image-side surface 152 of the fifth lens element 150 is Y52, the following condition is satisfied: Y11/Y52=0.44.

Figure 9:
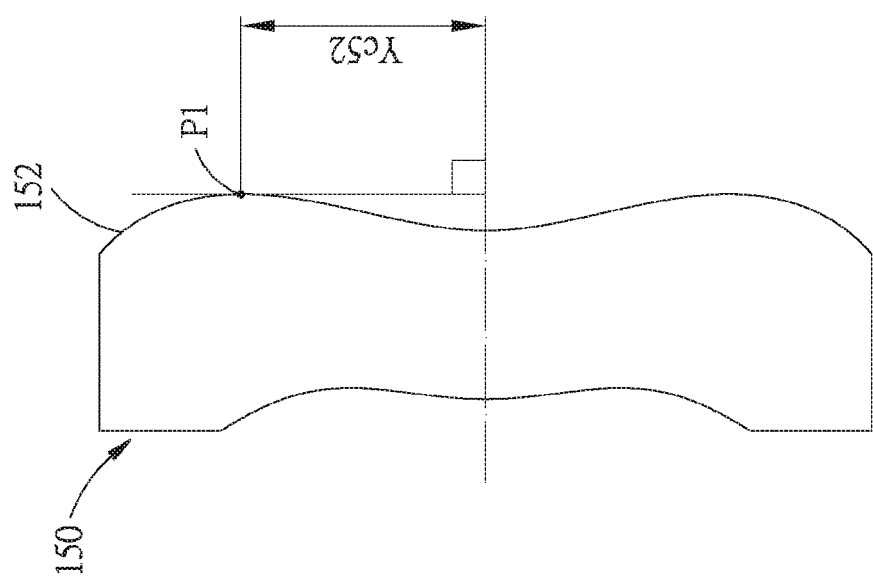
FIG. 9 shows a vertical distance between an off-axis tangential point of a tangent vertical to an optical axis on the image-side surface of the fifth lens element and the optical axis of the photographing optical lens assembly

In the photographing optical lens assembly of the imaging device according to the 1st embodiment (as shown in FIG. 9), when a vertical distance between an off-axis tangential point P1 of a tangent vertical to an optical axis on the image-side surface 152 of the fifth lens element 150 and the optical axis of the photographing optical lens assembly is Yc52, and the curvature radius of the object-side surface 111 of the first lens element 110 is R1, the following condition is satisfied: Yc52/R1=−0.08.

In the photographing optical lens assembly of the imaging device according to the 1st embodiment, when the curvature radius of the object-side surface 111 of the first lens element 110 is R1, and the curvature radius of the image-side surface 122 of the second lens element 120 is R4, the following condition is satisfied: Log(R1/f4)=0.53.

In the photographing optical lens assembly of the imaging device according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied: SD/TD=0.91.

In the photographing optical lens assembly of the imaging device according to the 1st embodiment, when an axial distance between the object-side surface 111 of the first lens element 110 and the image surface 170 is TL, and a maximum image height of the photographing optical lens assembly (half of a diagonal length of an effective photosensitive area of the image sensor 180) is ImgH, the following condition is satisfied: TL/ImgH=1.72.

The detailed optical data of the 1st embodiment are shown in Table 1 and the aspheric surface data are shown in Table 2 below.

TABLE 1

1st Embodiment
f = 3.39 mm, Fno = 2.20, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −18.451 | ASP | 0.345 | Plastic | 1.544 | 55.9 | 4.61 |
| 2 | | −2.223 | ASP | −0.018 | | | | |
| 3 | Ape. Stop | Plano | | 0.048 | | | | |
| 4 | Lens 2 | 1.822 | ASP | 0.342 | Plastic | 1.640 | 23.3 | −6.94 |
| 5 | | 1.197 | ASP | 0.263 | | | | |
| 6 | Lens 3 | 6.136 | ASP | 0.922 | Plastic | 1.544 | 55.9 | 2.67 |
| 7 | | −1.799 | ASP | 0.410 | | | | |
| 8 | Lens 4 | −0.633 | ASP | 0.230 | Plastic | 1.640 | 23.3 | −5.39 |
| 9 | | −0.886 | ASP | 0.229 | | | | |
| 10 | Lens 5 | 2.143 | ASP | 1.000 | Plastic | 1.535 | 55.7 | −74.77 |
| 11 | | 1.703 | ASP | 0.500 | | | | |
| 12 | IR-cut filter | Plano | | 0.300 | Glass | 1.517 | 64.2 | — |
| 13 | | Plano | | 0.337 | | | | |
| 14 | Image | Plano | | — | | | | |

Note:
Reference wavelength is 587.6 nm (d-line).

TABLE 2

Aspheric Coefficients

| Surface # | 1 | 2 | 4 | 5 | 6 |
|---|---|---|---|---|---|
| k = | −1.0000E+00 | −1.9595E+01 | −1.9989E+01 | −6.3153E+00 | 4.8729E+00 |
| A4 = | 2.8350E−02 | −8.2446E−04 | 2.6348E−01 | 5.3990E−03 | −3.1271E−02 |
| A6 = | 4.0263E−02 | −1.0240E−04 | −8.1931E−01 | 6.1102E−03 | 1.5797E−01 |
| A8 = | −3.8926E−01 | −3.7508E−02 | 1.9088E+00 | −4.5248E−02 | −5.2676E−01 |
| A10 = | 1.0470E+00 | 2.3354E−01 | −3.4557E+00 | −1.7014E−01 | 1.1409E+00 |
| A12 = | −1.4046E+00 | −5.5348E−01 | 4.0439E+00 | 3.8664E−01 | −1.4294E+00 |
| A14 = | 9.4956E−01 | 5.8908E−01 | −2.6931E+00 | −3.4112E−01 | 8.8882E−01 |
| A16 = | −2.5800E−01 | −2.3913E−01 | 7.4682E−01 | 1.1747E−01 | −2.0820E−01 |

| Surface # | 7 | 8 | 9 | 10 | 11 |
|---|---|---|---|---|---|
| k = | −1.0152E+01 | −2.4895E+00 | −3.3897E+00 | −3.2142E+00 | −1.0978E+01 |
| A4 = | −1.8646E−01 | 1.8120E−01 | 5.8411E−02 | −2.4197E−01 | −4.5223E−03 |
| A6 = | 2.0614E−01 | −6.3288E−01 | −2.0596E−01 | 1.3800E−01 | −2.7277E−02 |
| A8 = | −2.9576E−01 | 1.2240E+00 | 3.5535E−01 | −8.4015E−02 | 1.6375E−02 |
| A10 = | 2.9943E−01 | −1.2302E+00 | −2.1118E−01 | 3.8567E−02 | −5.3116E−03 |
| A12 = | −1.1976E−01 | 7.5471E−01 | 5.5527E−02 | −1.1303E−02 | 9.6916E−04 |
| A14 = | −4.2624E−02 | −2.9772E−01 | −8.9082E−03 | 1.9258E−03 | −9.4127E−05 |
| A16 = | 3.2875E−02 | 5.5956E−02 | 1.5824E−03 | −1.3574E−04 | 3.7347E−06 |

In Table 1, the curvature radius, the thickness and the focal length are shown in millimeters (mm) Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
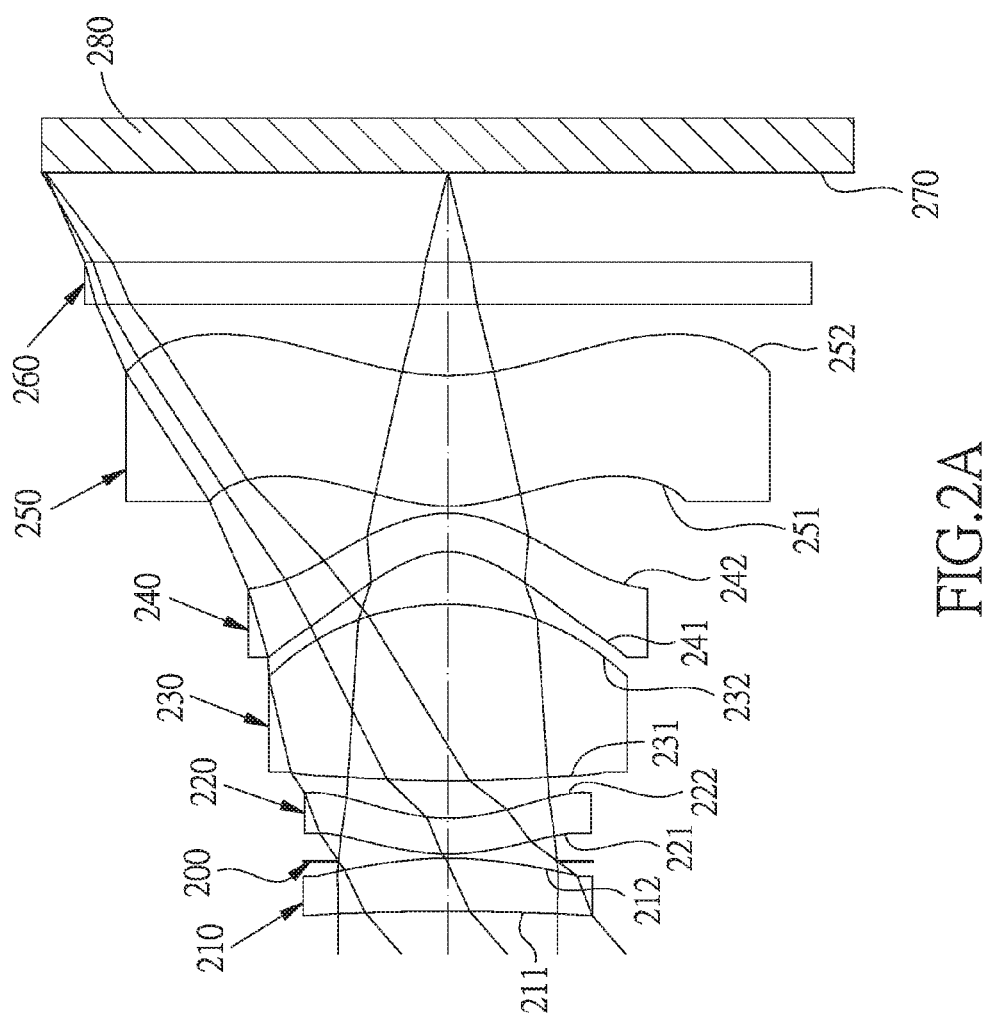
FIG. 2A is a schematic view of an imaging device according to the 2nd embodiment of the present disclosure.
Figure 2B:
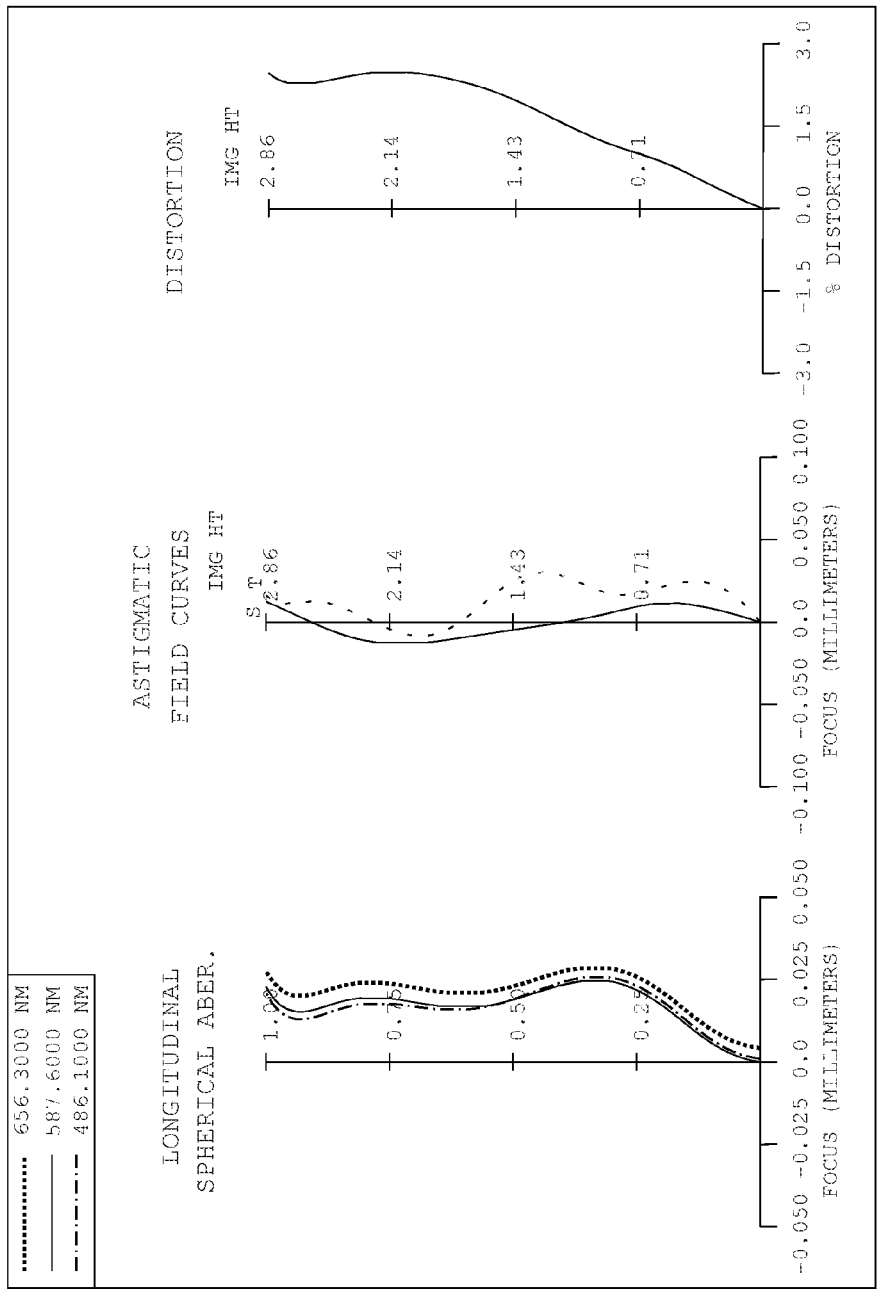
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging unit according to the 2nd embodiment.

In FIG. 2A, the imaging device includes the photographing optical lens assembly (not otherwise herein labeled) of the present disclosure and an image sensor 280. The photographing optical lens assembly comprises, in order from an object side to an image side, a first lens element 210, an aperture stop 200, a second lens element 220, a third lens element 230, a fourth lens element 240, a fifth lens element 250, an IR-cut filter 260 and an image surface 270, wherein the photographing optical lens assembly has a total of five non-cemented lens elements (210-250) with refractive power.

The first lens element 210 with positive refractive power has an aspheric object-side surface 211 being concave in a paraxial region and an aspheric image-side surface 212 being convex in a paraxial region, and the first lens element 210 is made of plastic material.

The second lens element 220 with negative refractive power has an aspheric object-side surface 221 being convex in a paraxial region and an aspheric image-side surface 222 being concave in a paraxial region, the second lens element 220 is made of plastic material, and inflection points are formed on the object-side surface 221 and the image-side surface 222 of the second lens element 220.

The third lens element 230 with positive refractive power has an aspheric object-side surface 231 being convex in a paraxial region and an aspheric image-side surface 232 being convex in a paraxial region, and the third lens element 230 is made of plastic material.

The fourth lens element 240 with negative refractive power has an aspheric object-side surface 241 being concave in a paraxial region and an aspheric image-side surface 242 being convex in a paraxial region, the fourth lens element 240 is made of plastic material, and inflection points are formed on the object-side surface 241 and the image-side surface 242 of the fourth lens element 240.

The fifth lens element 250 with positive refractive power has an aspheric object-side surface 251 being convex in a paraxial region and an aspheric image-side surface 252 being concave in a paraxial region, the fifth lens element 250 is made of plastic material, and inflection points are formed on the image-side surface 252 of the fifth lens element 250.

The IR-cut filter 260 is made of glass and located between the fifth lens element 250 and the image surface 270, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 3.17 mm, Fno = 2.05, HFOV = 41.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −11.152 ASP | 0.374 | Plastic | 1.570 | 55.9 | 5.30 |

TABLE 3-continued

2nd Embodiment
f = 3.17 mm, Fno = 2.05, HFOV = 41.2 deg.

| Surface # | | Curvature Radius | | Thickness | Material | Index | Abbe # | Focal Length |
|---|---|---|---|---|---|---|---|---|
| 2 | | −2.407 | ASP | −0.020 | | | | |
| 3 | Ape. Stop | Plano | | 0.050 | | | | |
| 4 | Lens 2 | 1.588 | ASP | 0.251 | Plastic | 1.650 | 21.4 | −10.29 |
| 5 | | 1.203 | ASP | 0.264 | | | | |
| 6 | Lens 3 | 8.734 | ASP | 1.243 | Plastic | 1.544 | 55.9 | 3.01 |
| 7 | | −1.911 | ASP | 0.370 | | | | |
| 8 | Lens 4 | −0.518 | ASP | 0.270 | Plastic | 1.650 | 21.4 | −3.06 |
| 9 | | −0.844 | ASP | 0.050 | | | | |
| 10 | Lens 5 | 1.173 | ASP | 0.920 | Plastic | 1.544 | 55.9 | 4.10 |
| 11 | | 1.787 | ASP | 0.500 | | | | |
| 12 | IR-cut filter | Plano | | 0.300 | Glass | 1.517 | 64.2 | — |
| 13 | | Plano | | 0.630 | | | | |
| 14 | Image | Plano | | — | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k = | −1.0000E+00 | −2.1770E+01 | −1.5639E+01 | −7.1229E+00 | 3.9595E+00 |
| A4 = | 5.5311E−02 | 1.0533E−02 | 2.3955E−01 | 9.5589E−03 | −2.4772E−02 |
| A6 = | −7.4540E−03 | −4.3353E−02 | −8.1719E−01 | −6.4081E−02 | 1.2946E−01 |
| A8 = | −3.2582E−01 | −4.5053E−03 | 1.8677E+00 | −9.7580E−03 | −5.2592E−01 |
| A10 = | 9.9213E−01 | 2.4934E−01 | −3.4158E+00 | −1.4231E−01 | 1.1391E+00 |
| A12 = | −1.4063E+00 | −6.9089E−01 | 4.0669E+00 | 3.6037E−01 | −1.4176E+00 |
| A14 = | 9.7107E−01 | 7.5454E−01 | −2.7851E+00 | −3.7870E−01 | 9.0502E−01 |
| A16 = | −2.6508E−01 | −3.0124E−01 | 7.9670E−01 | 1.5184E−01 | −2.2180E−01 |

| Surface # | 7 | 8 | 9 | 10 | 11 |
|---|---|---|---|---|---|
| k = | −9.4389E+00 | −2.5583E+00 | −3.2378E+00 | −6.8842E+00 | −6.3531E+00 |
| A4 = | −1.8824E−01 | 6.3544E−02 | 2.4227E−03 | −6.6756E−02 | 4.9858E−03 |
| A6 = | 1.8978E−01 | −6.1368E−01 | −2.1169E−01 | 2.4473E−02 | −3.2875E−02 |
| A8 = | −3.0844E−01 | 1.2527E+00 | 3.5317E−01 | −3.8449E−02 | 1.7641E−02 |
| A10 = | 3.1379E−01 | −1.2296E+00 | −2.0685E−01 | 3.3292E−02 | −5.2888E−03 |
| A12 = | −1.0391E−01 | 7.5358E−01 | 5.7150E−02 | −1.5487E−02 | 9.1334E−04 |
| A14 = | −3.8973E−02 | −2.9637E−01 | −9.1907E−03 | 3.7564E−03 | −8.6100E−05 |
| A16 = | 2.2802E−02 | 5.4328E−02 | 1.0902E−03 | −3.8796E−04 | 3.3468E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.17 | R10/f4 | −0.58 |
| Fno | 2.05 | f3/f1 | 0.57 |
| HFOV [deg.] | 41.2 | \|1/SF2\| + \|1/SF4\| + \|1/SF5\| | 0.58 |
| (V2 + V4)/V5 | 0.77 | Y11/Y52 | 0.45 |
| T12/T23 | 0.11 | Yc52/R1 | −0.14 |
| (T12 + T45)/(T23 + T34) | 0.13 | Log(R1/f4) | 0.56 |
| CT4/CT5 | 0.29 | SD/TD | 0.91 |
| (CT1 + CT2 + CT4)/(CT3 + CT5) | 0.41 | TL/ImgH | 1.82 |
| (R1 + R2)/(R1 − R2) | 1.55 | | |

3rd Embodiment

Figure 3A:
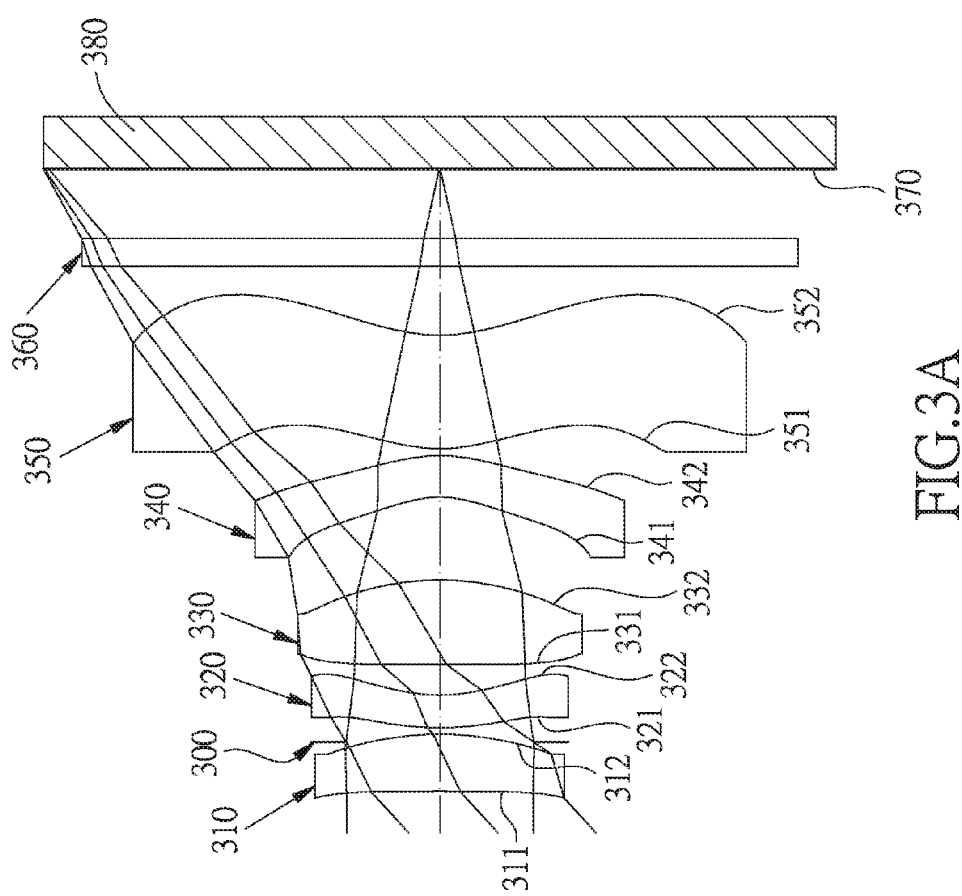
FIG. 3A is a schematic view of an imaging device according to the 3rd embodiment of the present disclosure.
Figure 3B:
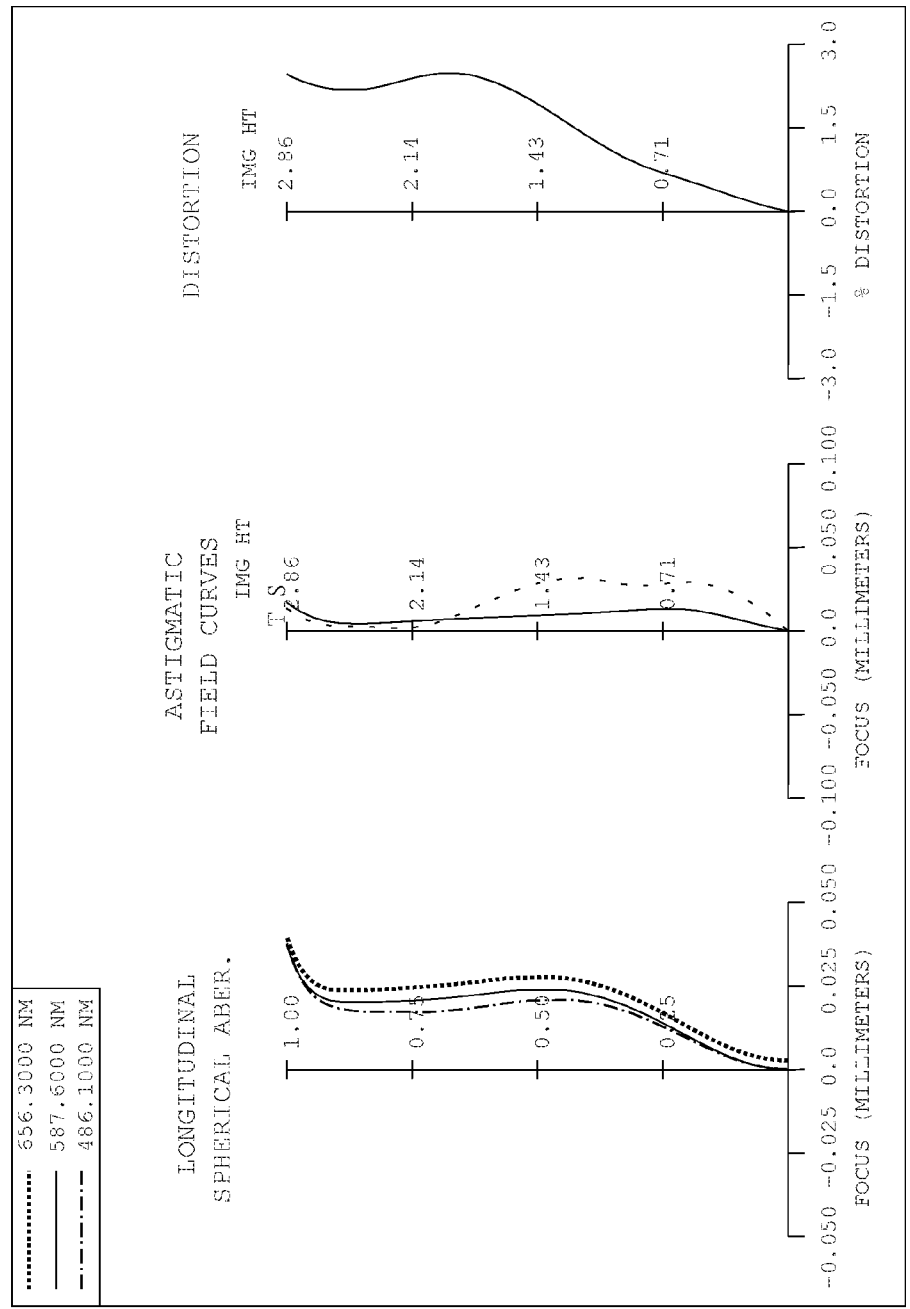
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging unit according to the 3rd embodiment.

In FIG. 3A, the imaging device includes the photographing optical lens assembly (not otherwise herein labeled) of the present disclosure and an image sensor 380. The photographing optical lens assembly comprises, in order from an object side to an image side, a first lens element 310, an aperture stop 300, a second lens element 320, a third lens element 330, a fourth lens element 340, a fifth lens element 350, an IR-cut filter 360 and an image surface 370, wherein the photographing optical lens assembly has a total of five non-cemented lens elements (310-350) with refractive power.

The first lens element 310 with positive refractive power has an aspheric object-side surface 311 being concave in a paraxial region and an aspheric image-side surface 312 being convex in a paraxial region, and the first lens element 310 is made of plastic material.

The second lens element 320 with negative refractive power has an aspheric object-side surface 321 being convex in a paraxial region and an aspheric image-side surface 322 being concave in a paraxial region, the second lens element 320 is made of plastic material, and inflection points are formed on the object-side surface 321 and the image-side surface 322 of the second lens element 320.

The third lens element 330 with positive refractive power has an aspheric object-side surface 331 being concave in a paraxial region and an aspheric image-side surface 332 being convex in a paraxial region, and the third lens element 330 is made of plastic material.

The fourth lens element 340 with negative refractive power has an aspheric object-side surface 341 being concave in a paraxial region and an aspheric image-side surface 342 being convex in a paraxial region, the fourth lens element 340 is made of plastic material, and inflection points are formed on the object-side surface 341 and the image-side surface 342 of the fourth lens element 340.

The fifth lens element 350 with positive refractive power has an aspheric object-side surface 351 being convex in a paraxial region and an aspheric image-side surface 352 being concave in a paraxial region, the fifth lens element 350 is made of plastic material, and inflection points are formed on the image-side surface 352 of the fifth lens element 350.

The IR-cut filter 360 is made of glass and located between the fifth lens element 350 and the image surface 370, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 3.06 mm, Fno = 2.27, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −101.915 | ASP | 0.414 | Plastic | 1.570 | 55.5 | 3.47 |
| 2 | | −1.942 | ASP | −0.056 | | | | |
| 3 | Ape. Stop | Plano | | 0.101 | | | | |
| 4 | Lens 2 | 2.008 | ASP | 0.237 | Plastic | 1.639 | 23.5 | −5.44 |
| 5 | | 1.214 | ASP | 0.223 | | | | |
| 6 | Lens 3 | −74.488 | ASP | 0.610 | Plastic | 1.570 | 55.5 | 3.44 |
| 7 | | −1.914 | ASP | 0.600 | | | | |
| 8 | Lens 4 | −0.740 | ASP | 0.300 | Plastic | 1.639 | 23.5 | −4.74 |
| 9 | | −1.134 | ASP | 0.050 | | | | |
| 10 | Lens 5 | 1.180 | ASP | 0.821 | Plastic | 1.535 | 55.7 | 8.01 |
| 11 | | 1.234 | ASP | 0.500 | | | | |
| 12 | IR-cut filter | Plano | | 0.200 | Glass | 1.517 | 64.2 | — |
| 13 | | Plano | | 0.501 | | | | |
| 14 | Image | Plano | | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k = | −1.0000E+00 | −1.8830E+01 | −2.2228E+01 | −8.4061E+00 | −1.0000E+00 |
| A4 = | −4.1541E−02 | −6.0686E−02 | 1.8677E−01 | 5.3710E−02 | 3.8951E−03 |
| A6 = | 3.1672E−02 | −4.1341E−02 | −7.4076E−01 | −1.2595E−01 | 2.1825E−01 |
| A8 = | −3.3042E−01 | 7.0860E−02 | 1.6938E+00 | −3.5179E−02 | −5.7086E−01 |
| A10 = | 9.6643E−01 | 1.0801E−01 | −3.6955E+00 | −1.4392E−01 | 1.1253E+00 |
| A12 = | −1.4583E+00 | −9.5896E−01 | 4.2859E+00 | 3.5854E−01 | −1.3792E+00 |
| A14 = | 1.0069E+00 | 1.4624E+00 | −1.6215E+00 | −3.8129E−01 | 9.2401E−01 |
| A16 = | −2.5893E−01 | −6.9110E−01 | −9.4251E−01 | 1.1767E−01 | −2.4446E−01 |

| Surface # | 7 | 8 | 9 | 10 | 11 |
|---|---|---|---|---|---|
| k = | −1.3884E+01 | −4.2391E+00 | −4.4554E+00 | −6.5154E+00 | −6.1654E+00 |
| A4 = | −1.8118E−01 | 4.1589E−01 | 2.7463E−01 | −1.0926E−01 | −2.4362E−02 |
| A6 = | 2.4388E−01 | −8.4963E−01 | −3.5308E−01 | 3.7605E−02 | −1.7885E−02 |
| A8 = | −3.4589E−01 | 1.1671E+00 | 3.1129E−01 | −4.2205E−02 | 1.2993E−02 |
| A10 = | 2.7141E−01 | −1.2146E+00 | −1.9600E−01 | 3.3736E−02 | −4.6987E−03 |
| A12 = | −1.1446E−01 | 7.6872E−01 | 6.5842E−02 | −1.5102E−02 | 9.2687E−04 |
| A14 = | −1.1124E−02 | −2.8109E−01 | −8.5005E−03 | 3.4661E−03 | −9.5929E−05 |
| A16 = | 5.7307E−02 | 3.8248E−02 | 2.2716E−04 | −3.0618E−04 | 4.0110E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.06 | R10/f4 | −0.26 |
| Fno | 2.27 | f3/f1 | 0.99 |
| HFOV [deg.] | 42.2 | \|1/SF2\| + \|1/SF4\| + \|1/SF5\| | 0.48 |
| (V2 + V4)/V5 | 0.84 | Y11/Y52 | 0.41 |
| T12/T23 | 0.20 | Yc52/R1 | −0.01 |
| (T12 + T45)/(T23 + T34) | 0.12 | Log(R1/f4) | 1.33 |
| CT4/CT5 | 0.37 | SD/TD | 0.89 |
| (CT1 + CT2 + CT4)/(CT3 + CT5) | 0.66 | TL/ImgH | 1.58 |
| (R1 + R2)/(R1 − R2) | 1.04 | | |

4th Embodiment

Figure 4A:
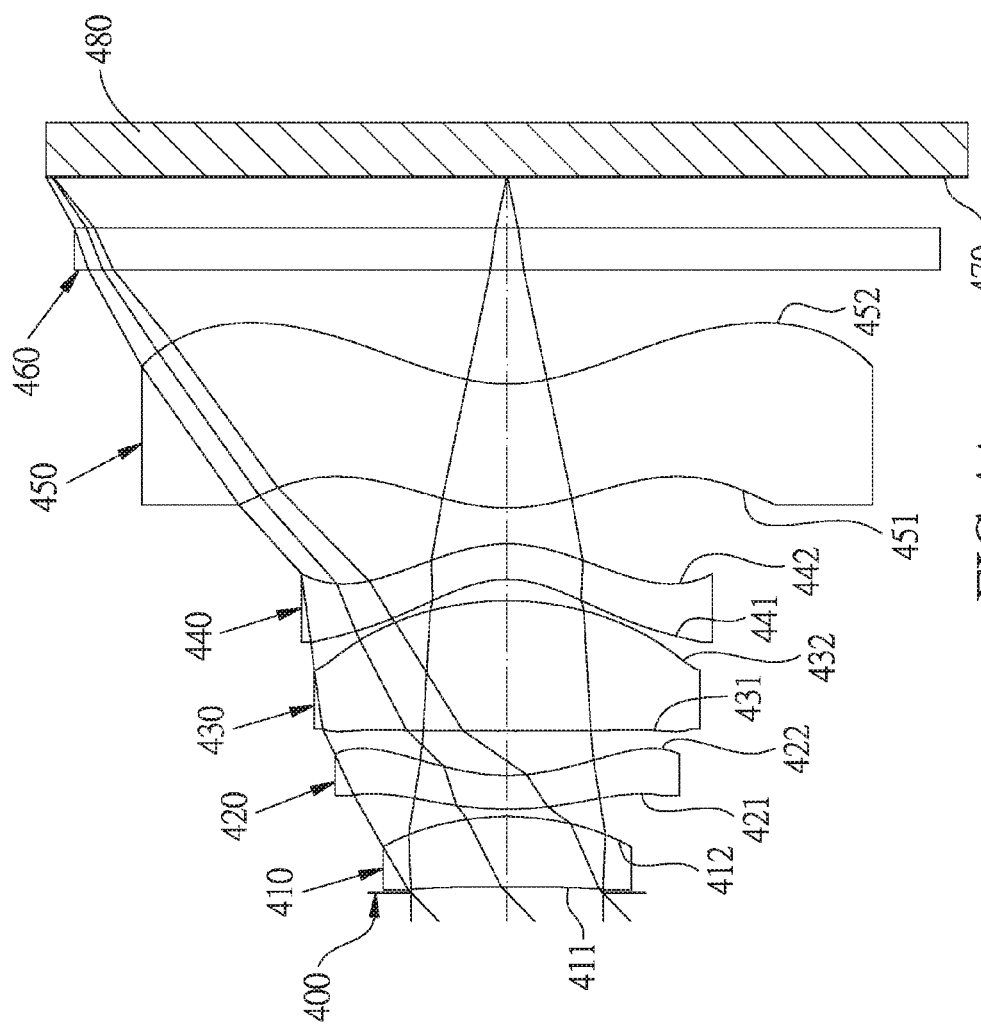
FIG. 4A is a schematic view of an imaging device according to the 4th embodiment of the present disclosure.
Figure 4B:
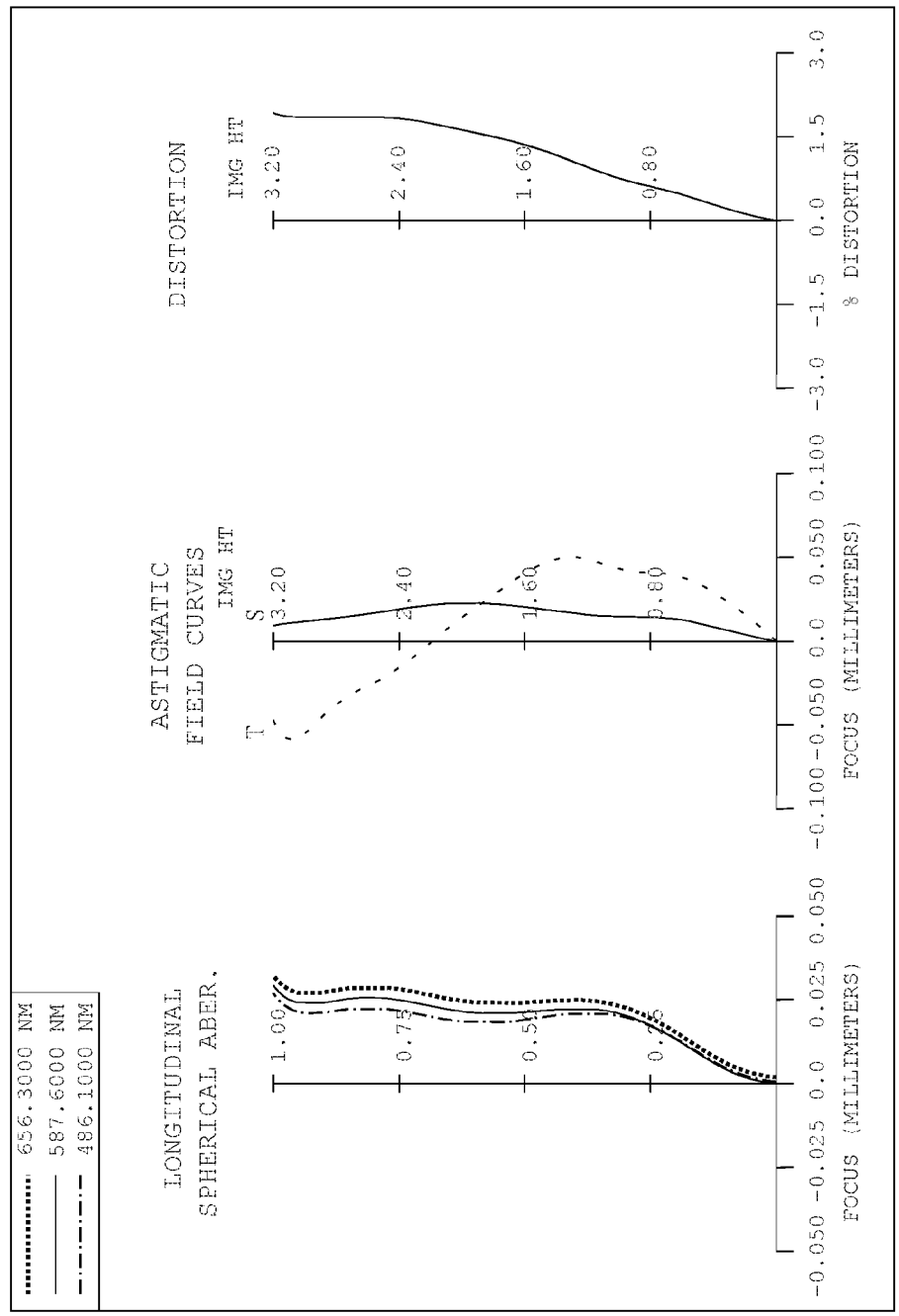
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging unit according to the 4th embodiment.

In FIG. 4A, the imaging device includes the photographing optical lens assembly (not otherwise herein labeled) of the present disclosure and an image sensor 480. The photographing optical lens assembly comprises, in order from an object side to an image side, a first lens element 410, an aperture stop 400, a second lens element 420, a third lens element 430, a fourth lens element 440, a fifth lens element 450, an IR-cut filter 460 and an image surface 470, wherein the photographing optical lens assembly has a total of five non-cemented lens elements (410-450) with refractive power.

The first lens element 410 with positive refractive power has an aspheric object-side surface 411 being concave in a paraxial region and an aspheric image-side surface 412 being convex in a paraxial region, and the first lens element 410 is made of plastic material.

The second lens element 420 with negative refractive power has an aspheric object-side surface 421 being convex in a paraxial region and an aspheric image-side surface 422 being concave in a paraxial region, the second lens element 420 is made of plastic material, and inflection points are formed on the object-side surface 421 and the image-side surface 422 of the second lens element 420.

The third lens element 430 with positive refractive power has an aspheric object-side surface 431 being convex in a paraxial region and an aspheric image-side surface 432 being convex in a paraxial region, and the third lens element 430 is made of plastic material.

The fourth lens element 440 with negative refractive power has an aspheric object-side surface 441 being concave in a paraxial region and an aspheric image-side surface 442 being convex in a paraxial region, the fourth lens element 440 is made of plastic material, and inflection points are formed on the object-side surface 441 and the image-side surface 442 of the fourth lens element 440.

The fifth lens element 450 with positive refractive power has an aspheric object-side surface 451 being convex in a paraxial region and an aspheric image-side surface 452 being concave in a paraxial region, the fifth lens element 450 is made of plastic material, and inflection points are formed on the image-side surface 452 of the fifth lens element 450.

The IR-cut filter 460 is made of glass and located between the fifth lens element 450 and the image surface 470, and will not affect the focal length of the photographing optical lens assembly.

The detailed optical data of the 4th embodiment are shown in Table 7 and the aspheric surface data are shown in Table 8 below.

TABLE 7

4th Embodiment
f = 3.24 mm, Fno = 2.40, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.041 | | | | |
| 2 | Lens 1 | −323.483 | ASP | 0.497 | Plastic | 1.544 | 55.9 | 3.42 |
| 3 | | −1.853 | ASP | 0.050 | | | | |
| 4 | Lens 2 | 2.219 | ASP | 0.238 | Plastic | 1.639 | 23.5 | −6.21 |
| 5 | | 1.364 | ASP | 0.315 | | | | |
| 6 | Lens 3 | 23.027 | ASP | 0.915 | Plastic | 1.544 | 55.9 | 3.84 |
| 7 | | −2.266 | ASP | 0.151 | | | | |
| 8 | Lens 4 | −0.726 | ASP | 0.250 | Plastic | 1.639 | 23.5 | −6.02 |
| 9 | | −1.015 | ASP | 0.253 | | | | |
| 10 | Lens 5 | 1.335 | ASP | 0.873 | Plastic | 1.544 | 55.9 | 12.20 |
| 11 | | 1.287 | ASP | 0.800 | | | | |
| 12 | IR-cut filter | Plano | | 0.300 | Glass | 1.517 | 64.2 | — |
| 13 | | Plano | | 0.358 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −1.0000E+00 | −1.3740E+01 | −3.4720E+01 | −1.0520E+01 | 0.0000E+00 |
| A4 = | −6.4354E−02 | −1.1693E−01 | 2.3905E−01 | 1.0111E−01 | −7.6512E−02 |
| A6 = | −6.1173E−03 | −3.4851E−02 | −6.5279E−01 | −1.3319E−01 | 1.7065E−01 |
| A8 = | −1.6412E−01 | 4.4307E−02 | 9.9326E−01 | −1.1186E−01 | −2.5734E−01 |
| A10 = | 1.8491E−01 | −5.3386E−02 | −1.2676E+00 | −1.5447E−02 | 3.7816E−01 |
| A12 = | −1.9320E−02 | −2.9147E−01 | 1.1035E+00 | 1.1157E−01 | −4.0327E−01 |
| A14 = | −4.6029E−02 | 8.6525E−01 | −5.0576E−01 | −9.8974E−02 | 2.1222E−01 |
| A16 = | −6.8301E−02 | −5.9543E−01 | 8.1628E−02 | 2.6657E−02 | −4.0626E−02 |

| Surface # | 7 | 8 | 9 | 10 | 11 |
|---|---|---|---|---|---|
| k = | −2.2302E−01 | −1.9462E+00 | −2.0002E+00 | −3.9854E+00 | −3.2608E+00 |
| A4 = | −7.4700E−02 | 3.7249E−01 | 2.3158E−01 | −8.9490E−02 | −4.0800E−02 |
| A6 = | 1.4074E−01 | −4.6239E−01 | −1.8378E−01 | 2.0191E−02 | −2.2654E−03 |
| A8 = | −1.6490E−01 | 5.2253E−01 | 1.4808E−01 | −1.7922E−02 | 4.6095E−03 |
| A10 = | 9.9960E−02 | −4.2894E−01 | −6.9225E−02 | 1.2161E−02 | −1.5449E−03 |
| A12 = | −2.4333E−02 | 2.2440E−01 | 1.8579E−02 | −4.3184E−03 | 2.5598E−04 |
| A14 = | −6.8871E−03 | −6.6930E−02 | −2.4123E−03 | 7.8577E−04 | −2.2089E−05 |
| A16 = | 4.1357E−03 | 8.6309E−02 | 4.0875E−05 | −5.6822E−05 | 7.8199E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.24 | R10/f4 | −0.21 |
| Fno | 2.40 | f3/f1 | 1.12 |
| HFOV [deg.] | 44.0 | \|1/SF2\| + \|1/SF4\| + \|1/SF5\| | 0.42 |
| (V2 + V4)/V5 | 0.84 | Y11/Y52 | 0.27 |
| T12/T23 | 0.16 | Yc52/R1 | −0.01 |
| (T12 + T45)/(T23 + T34) | 0.65 | Log(R1/f4) | 1.73 |
| CT4/CT5 | 0.29 | SD/TD | 1.01 |
| (CT1 + CT2 + CT4)/(CT3 + CT5) | 0.55 | TL/ImgH | 1.56 |
| (R1 + R2)/(R1 − R2) | 1.01 | | |

5th Embodiment

Figure 5A:
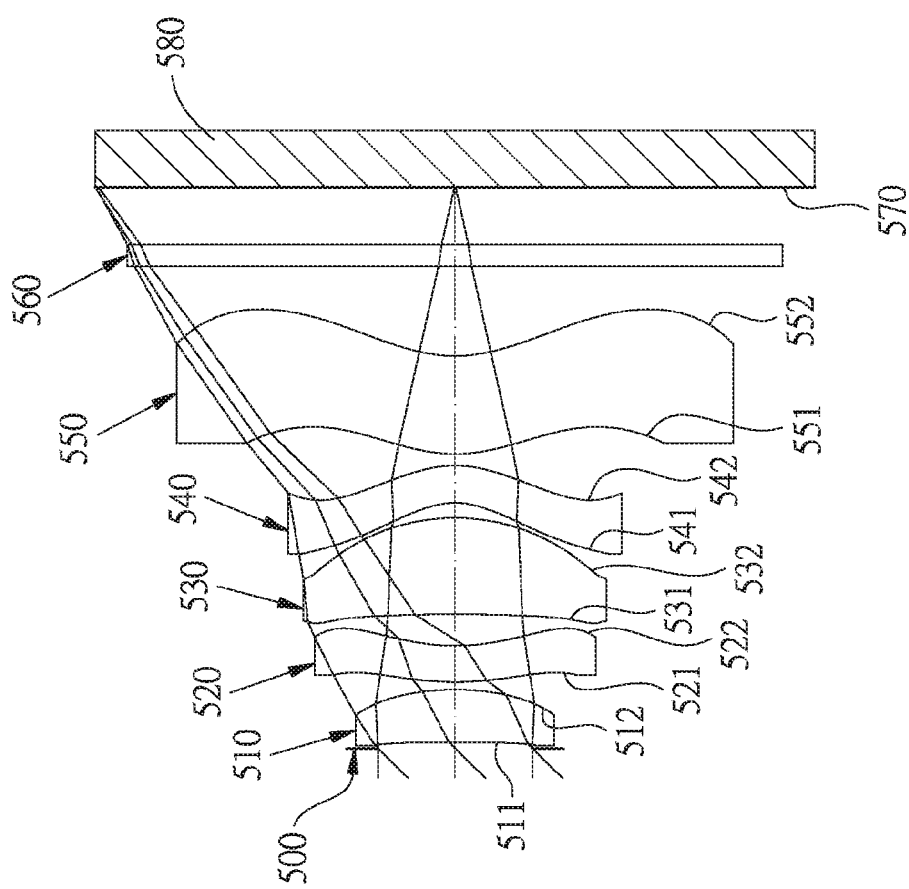
FIG. 5A is a schematic view of an imaging device according to the 5th embodiment of the present disclosure.
Figure 5B:
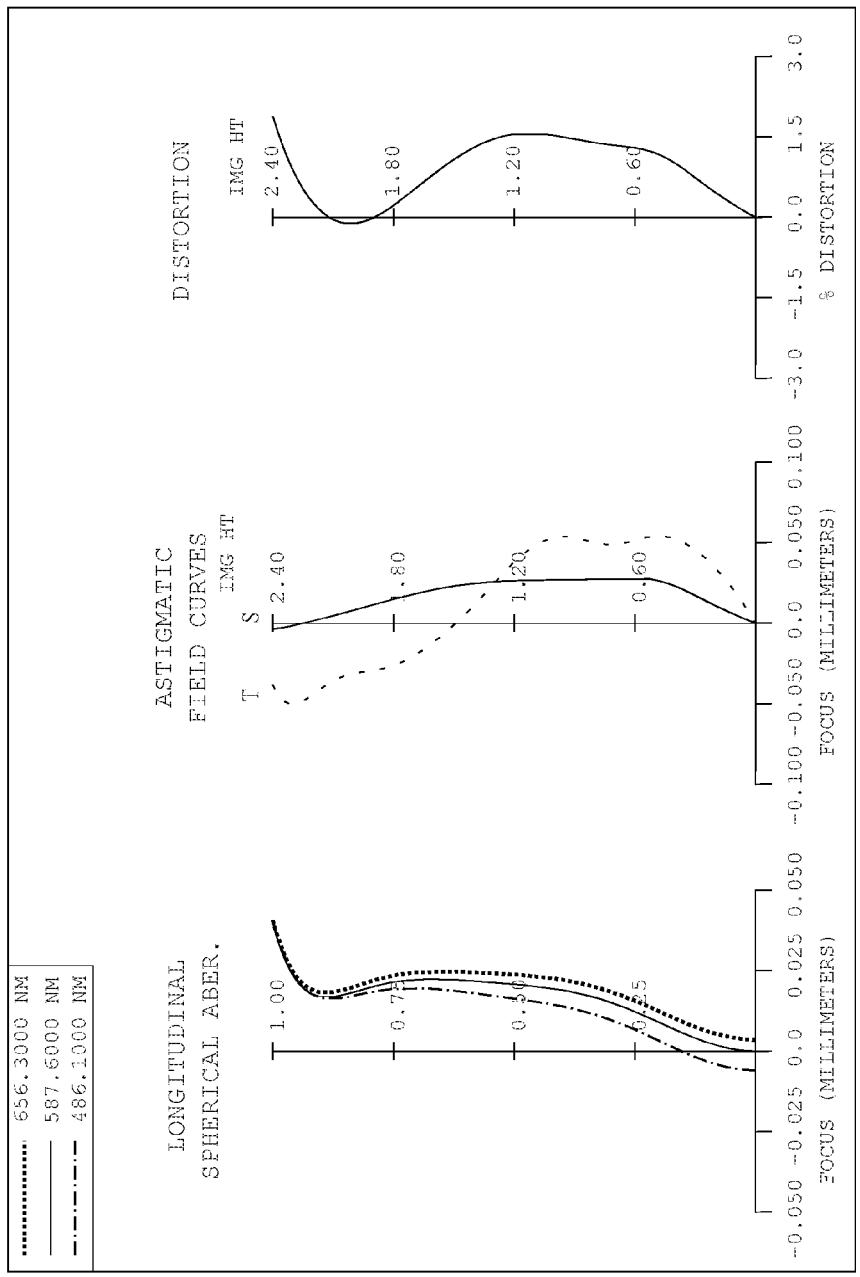
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging unit according to the 5th embodiment.

In FIG. 5A, the imaging device includes the photographing optical lens assembly (not otherwise herein labeled) of the present disclosure and an image sensor 580. The photographing optical lens assembly comprises, in order from an object side to an image side, a first lens element 510, an aperture stop 500, a second lens element 520, a third lens element 530, a fourth lens element 540, a fifth lens element 550, an IR-cut filter 560 and an image surface 570, wherein the photographing optical lens assembly has a total of four non-cemented lens elements (510-550) with refractive power.

The first lens element 510 with positive refractive power has an aspheric object-side surface 511 being concave in a paraxial region and an aspheric image-side surface 512 being convex in a paraxial region, and the first lens element 510 is made of plastic material.

The second lens element 520 with negative refractive power has an aspheric object-side surface 521 being convex in a paraxial region and an aspheric image-side surface 522 being concave in a paraxial region, the second lens element 520 is made of plastic material, and inflection points are formed on the object-side surface 521 and the image-side surface 522 of the second lens element 520.

The third lens element 530 with positive refractive power has an aspheric object-side surface 531 being concave in a paraxial region and an aspheric image-side surface 532 being convex in a paraxial region, and the third lens element 530 is made of plastic material.

The fourth lens element 540 with negative refractive power has an aspheric object-side surface 541 being concave in a paraxial region and an aspheric image-side surface 542 being convex in a paraxial region, the fourth lens element 540 is made of plastic material, and inflection points are formed on the object-side surface 541 and the image-side surface 542 of the fourth lens element 540.

The fifth lens element 550 with positive refractive power has an aspheric object-side surface 551 being convex in a paraxial region and an aspheric image-side surface 552 being concave in a paraxial region, the fifth lens element 550 is made of plastic material, and inflection points are formed on the image-side surface 552 of the fifth lens element 550.

The IR-cut filter 560 is made of plastic and located between the fifth lens element 550 and the image surface 570, and will not affect the focal length of the photographing optical lens assembly.

The detailed optical data of the 5th embodiment are shown in Table 9 and the aspheric surface data are shown in Table 10 below.

TABLE 9

5th Embodiment
f = 2.32 mm, Fno = 2.25, HFOV = 45.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.040 | | | | |
| 2 | Lens 1 | −314.504 | ASP | 0.353 | Plastic | 1.544 | 55.9 | 3.09 |
| 3 | | −1.676 | ASP | 0.050 | | | | |
| 4 | Lens 2 | 2.027 | ASP | 0.242 | Plastic | 1.650 | 21.5 | −7.80 |
| 5 | | 1.380 | ASP | 0.210 | | | | |
| 6 | Lens 3 | −22.925 | ASP | 0.644 | Plastic | 1.544 | 55.9 | 2.75 |
| 7 | | −1.419 | ASP | 0.100 | | | | |
| 8 | Lens 4 | −0.533 | ASP | 0.250 | Plastic | 1.650 | 21.5 | −4.89 |
| 9 | | −0.758 | ASP | 0.077 | | | | |
| 10 | Lens 5 | 0.999 | ASP | 0.654 | Plastic | 1.544 | 55.9 | 9.09 |
| 11 | | 0.963 | ASP | 0.600 | | | | |
| 12 | IR-cut filter | Plano | | 0.145 | Plastic | 1.514 | 56.8 | — |
| 13 | | Plano | | 0.381 | | | | |
| 14 | Image | Plano | | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | −1.0000E+00 | −1.4007E+01 | −4.5450E+01 | −1.2791E+01 | 0.0000E+00 |
| A4 = | −1.5658E−01 | −3.2929E−01 | 5.2199E−01 | 2.3991E−01 | −1.8354E−01 |
| A6 = | −4.7768E−02 | −1.6652E−01 | −2.7267E+00 | −5.5259E−01 | 6.8784E−01 |
| A8 = | −1.2326E+00 | 3.4280E−01 | 7.4478E+00 | −8.5169E−02 | −1.9305E+00 |
| A10 = | 2.3944E+00 | −6.6623E−01 | −1.6886E+01 | −2.1113E−01 | 5.0387E+00 |
| A12 = | −7.5141E−01 | −6.8155E+00 | 2.6116E+01 | 2.6348E+00 | −9.5425E+00 |
| A14 = | −3.5348E+00 | 3.5099E+01 | −2.1301E+01 | −4.1745E+00 | 8.9411E+00 |
| A16 = | −1.2186E+01 | −4.4635E+01 | 6.1210E+00 | 1.9795E+00 | −3.0305E+00 |

| Surface # | 7 | 8 | 9 | 10 | 11 |
|---|---|---|---|---|---|
| k = | −2.7956E−01 | −1.9254E+00 | −1.8060E+00 | −3.5312E+00 | −3.2924E+00 |
| A4 = | −1.7546E−01 | 8.7850E−01 | 5.4632E−01 | −2.1565E−01 | −9.2882E−02 |
| A6 = | 6.0279E−01 | −1.9482E+00 | −7.7686E−01 | 9.3929E−02 | −1.4243E−02 |
| A8 = | −1.2490E+00 | 3.9172E+00 | 1.1073E+00 | −1.3380E−01 | 3.5061E−02 |
| A10 = | 1.3407E+00 | −5.7105E+00 | −9.2314E−01 | 1.6184E−01 | −2.0554E−02 |
| A12 = | −5.9901E−01 | 5.3140E+00 | 4.3948E−01 | −1.0241E−01 | 6.0594E−03 |
| A14 = | −2.4864E−01 | −2.8167E+00 | −1.0135E−01 | 3.2958E−02 | −9.3056E−04 |
| A16 = | 3.1462E−01 | 6.4394E−01 | 3.6198E−03 | −4.3239E−03 | 5.8258E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.32 | R10/f4 | −0.20 |
| Fno | 2.25 | f3/f1 | 0.89 |
| HFOV [deg.] | 45.3 | \|1/SF2\| + \|1/SF4\| + \|1/SF5\| | 0.38 |
| (V2 + V4)/V5 | 0.77 | Y11/Y52 | 0.29 |
| T12/T23 | 0.24 | Yc52/R1 | −0.004 |
| (T12 + T45)/(T23 + T34) | 0.41 | Log(R1/f4) | 1.81 |
| CT4/CT5 | 0.38 | SD/TD | 1.02 |

-continued

| 5th Embodiment | | | |
|---|---|---|---|
| (CT1 + CT2 + CT4)/(CT3 + CT5) | 0.65 | TL/ImgH | 1.54 |
| (R1 + R2)/(R1 − R2) | 1.01 | | |

6th Embodiment

Figure 6A:
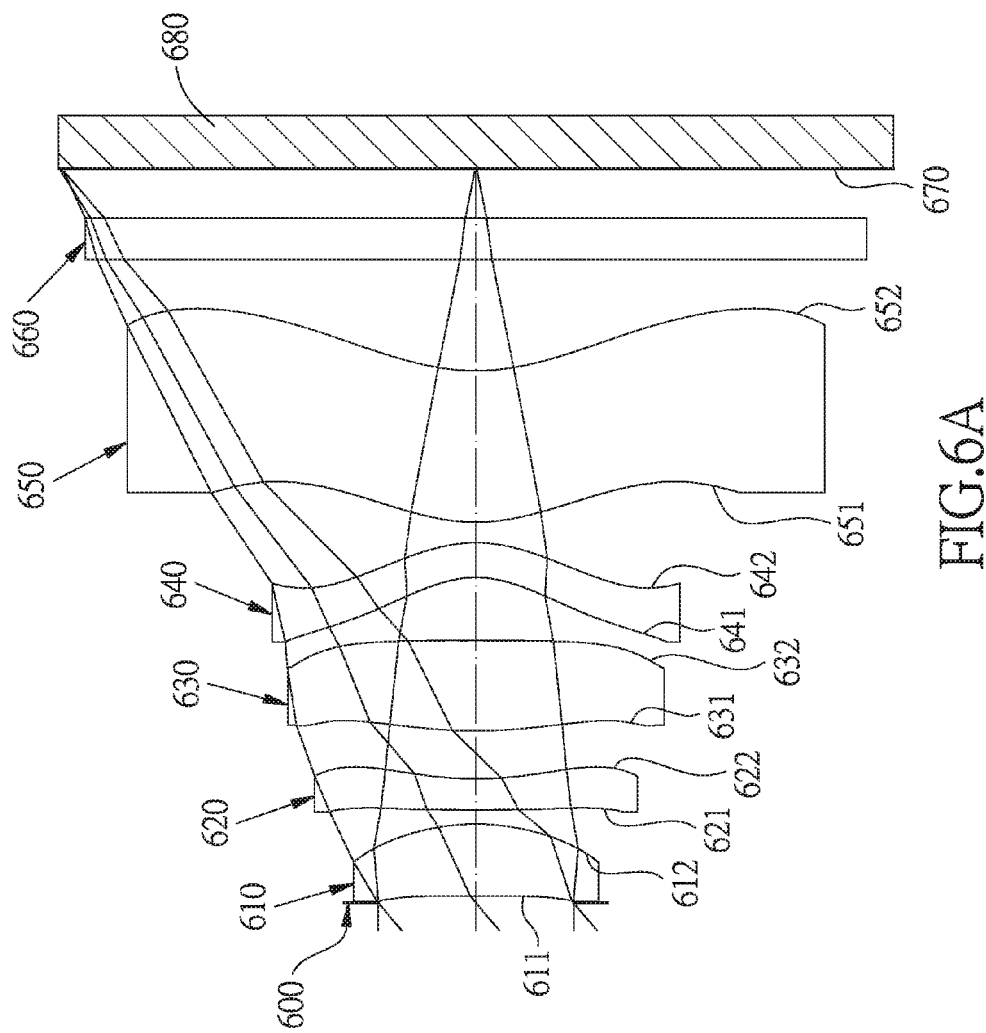
FIG. 6A is a schematic view of an imaging device according to the 6th embodiment of the present disclosure.
Figure 6B:
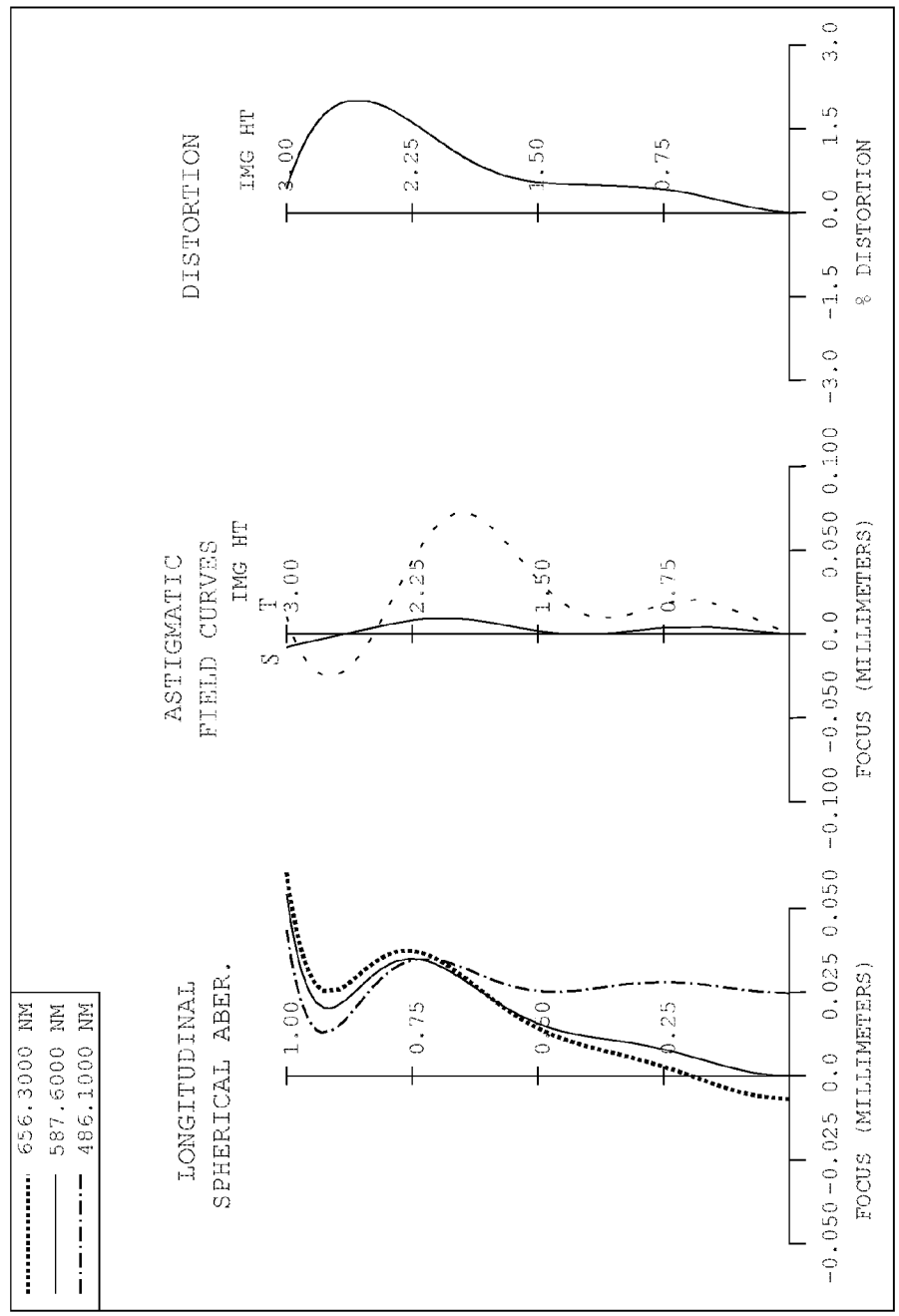
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging unit according to the 6th embodiment.

In FIG. 6A, the imaging device includes the photographing optical lens assembly (not otherwise herein labeled) of the present disclosure and an image sensor 680. The photographing optical lens assembly comprises, in order from an object side to an image side, a first lens element 610, an aperture stop 600, a second lens element 620, a third lens element 630, a fourth lens element 640, a fifth lens element 650, an IR-cut filter 660 and an image surface 670, wherein the photographing optical lens assembly has a total of five non-cemented lens elements (610-650) with refractive power.

The first lens element 610 with positive refractive power has an aspheric object-side surface 611 being concave in a paraxial region and an aspheric image-side surface 612 being convex in a paraxial region, and the first lens element 610 is made of plastic material.

The second lens element 620 with negative refractive power has an aspheric object-side surface 621 being concave in a paraxial region and an aspheric image-side surface 622 being concave in a paraxial region, the second lens element 620 is made of plastic material, and inflection points are formed on the object-side surface 621 and the image-side surface 622 of the second lens element 620.

The third lens element 630 with positive refractive power has an aspheric object-side surface 631 being convex in a paraxial region and an aspheric image-side surface 632 being concave in a paraxial region, and the third lens element 630 is made of plastic material.

The fourth lens element 640 with negative refractive power has an aspheric object-side surface 641 being concave in a paraxial region and an aspheric image-side surface 642 being convex in a paraxial region, the fourth lens element 640 is made of plastic material, and inflection points are formed on the object-side surface 641 and the image-side surface 642 of the fourth lens element 640.

The fifth lens element 650 with positive refractive power has an aspheric object-side surface 651 being convex in a paraxial region and an aspheric image-side surface 652 being concave in a paraxial region, the fifth lens element 650 is made of plastic material, and inflection points are formed on the image-side surface 652 of the fifth lens element 650.

The IR-cut filter 660 is made of glass and located between the fifth lens element 650 and the image surface 670, and will not affect the focal length of the photographing optical lens assembly.

The detailed optical data of the 6th embodiment are shown in Table 11 and the aspheric surface data are shown in Table 12 below.

TABLE 11

6th Embodiment
f = 3.51 mm, Fno = 2.50, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.050 | | | | |
| 2 | Lens 1 | −351.825 | ASP | 0.519 | Plastic | 1.544 | 55.9 | 2.66 |
| 3 | | −1.440 | ASP | 0.102 | | | | |
| 4 | Lens 2 | −35.286 | ASP | 0.222 | Plastic | 1.639 | 23.5 | −3.48 |
| 5 | | 2.382 | ASP | 0.346 | | | | |
| 6 | Lens 3 | 3.240 | ASP | 0.651 | Plastic | 1.544 | 55.9 | 6.18 |
| 7 | | 82.645 | ASP | 0.455 | | | | |
| 8 | Lens 4 | −0.737 | ASP | 0.250 | Plastic | 1.614 | 25.6 | −6.98 |
| 9 | | −1.005 | ASP | 0.148 | | | | |
| 10 | Lens 5 | 1.322 | ASP | 1.091 | Plastic | 1.544 | 55.9 | 6.01 |
| 11 | | 1.574 | ASP | 0.800 | | | | |
| 12 | IR-cut filter | Plano | | 0.300 | Glass | 1.517 | 64.2 | — |
| 13 | | Plano | | 0.356 | | | | |
| 14 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −1.0000E+00 | −1.1246E+01 | 2.0000E+01 | −2.5218E+01 | −6.7327E+00 |
| A4 = | −1.2468E−01 | −1.4243E−01 | 2.5951E−01 | 6.8641E−02 | −9.6701E−02 |
| A6 = | −9.0206E−03 | −4.7565E−02 | −6.5383E−01 | −1.3279E−01 | 1.4158E−01 |
| A8 = | −1.5778E−01 | 4.0396E−02 | 9.9627E−01 | −1.2853E−02 | −2.5834E−01 |
| A10 = | 1.8342E−01 | −6.4850E−02 | −1.2661E+00 | −1.4843E−02 | 3.7952E−01 |
| A12 = | −2.4943E−02 | −3.0737E−01 | 1.1034E+00 | 1.1292E−01 | −4.0245E−01 |
| A14 = | −7.2963E−02 | 8.6609E−01 | −5.1044E−01 | −9.8784E−02 | 2.1240E−01 |
| A16 = | −1.7997E−01 | −5.7840E−01 | 8.3011E−02 | 2.6846E−02 | −4.0513E−02 |

| Surface # | 7 | 8 | 9 | 10 | 11 |
|---|---|---|---|---|---|
| k = | −2.0315E+01 | −2.0463E+00 | −1.6826E+00 | −4.0224E+00 | −3.0556E+00 |
| A4 = | −9.4897E−02 | 3.6497E−01 | 2.3092E−01 | −6.4741E−02 | −3.4665E−02 |
| A6 = | 1.3985E−01 | −4.6503E−01 | −1.8365E−01 | 2.1143E−02 | −2.4744E−03 |
| A8 = | −1.6556E−01 | 5.2258E−01 | 1.4736E−01 | −1.8834E−02 | 4.6146E−03 |
| A10 = | 9.4130E−02 | −4.2840E−01 | −6.9398E−02 | 1.2105E−02 | −1.5476E−03 |
| A12 = | −2.2320E−02 | 2.2465E−01 | 1.8514E−02 | −4.3218E−03 | 2.5630E−04 |
| A14 = | −7.4040E−03 | −6.6930E−02 | −2.4220E−03 | 7.8758E−04 | −2.2056E−05 |
| A16 = | 4.1603E−03 | 8.4286E−03 | 5.2538E−05 | −5.6408E−05 | 7.7834E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.51 | R10/f4 | −0.23 |
| Fno | 2.50 | f3/f1 | 2.33 |
| HFOV [deg.] | 40.2 | \|1/SF2\| + \|1/SF4\| + \|1/SF5\| | 1.39 |
| (V2 + V4)/V5 | 0.88 | Y11/Y52 | 0.28 |
| T12/T23 | 0.29 | Yc52/R1 | −0.01 |
| (T12 + T45)/(T23 + T34) | 0.31 | Log(R1/f4) | 1.70 |
| CT4/CT5 | 0.23 | SD/TD | 1.01 |
| (CT1 + CT2 + CT4)/(CT3 + CT5) | 0.57 | TL/ImgH | 1.75 |
| (R1 + R2)/(R1 − R2) | 1.01 | | |

7th Embodiment

Figure 7A:
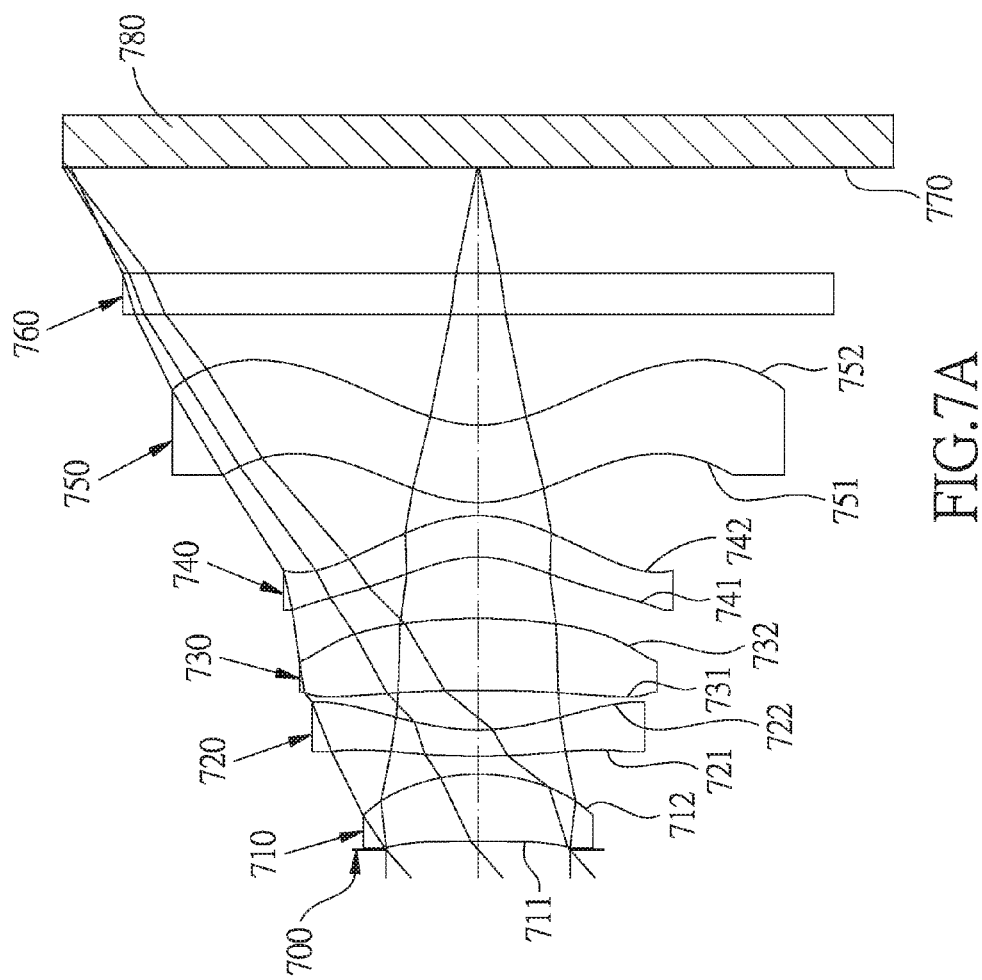
FIG. 7A is a schematic view of an imaging device according to the 7th embodiment of the present disclosure.
Figure 7B:
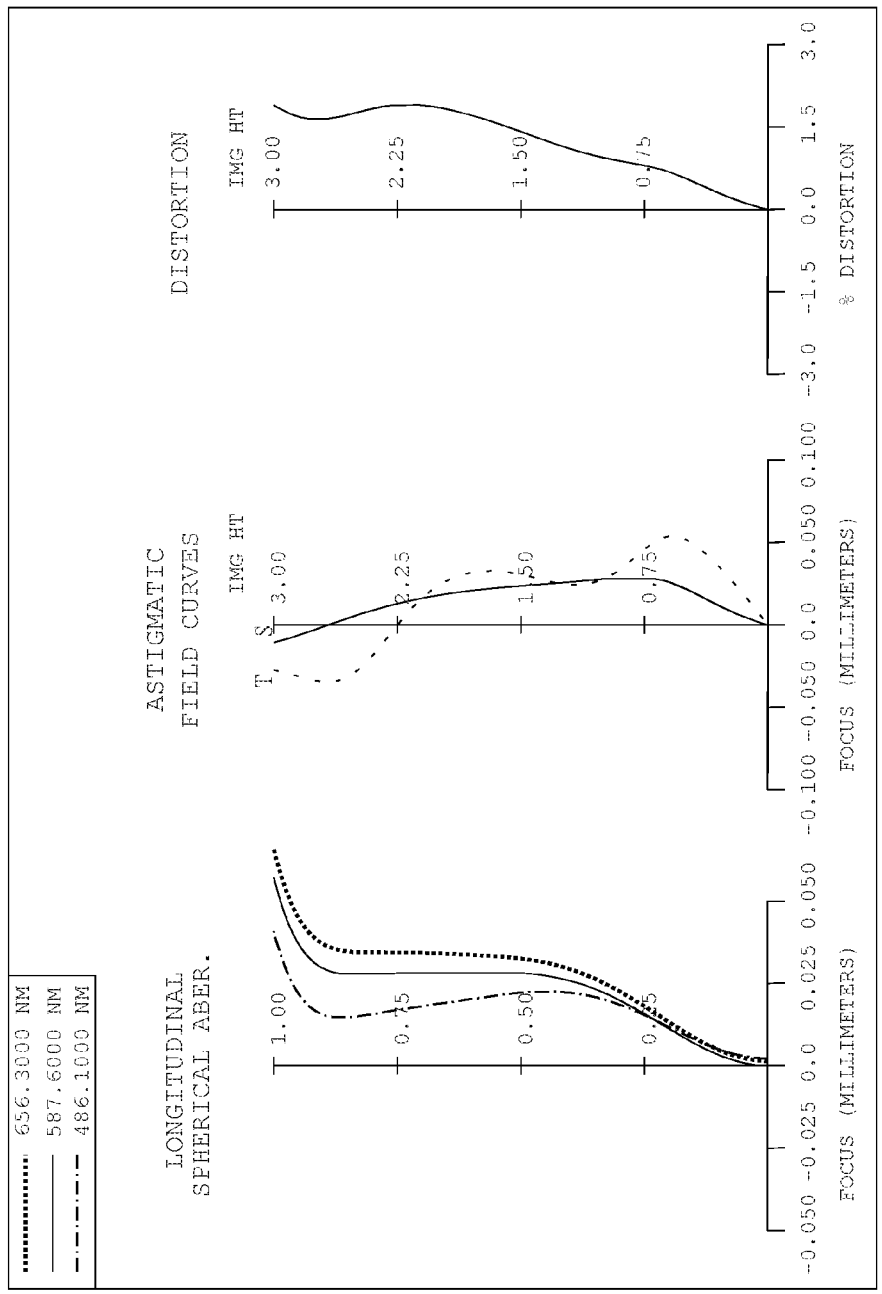
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging unit according to the 7th embodiment.

In FIG. 7A, the imaging device includes the photographing optical lens assembly (not otherwise herein labeled) of the present disclosure and an image sensor 780. The photographing optical lens assembly comprises, in order from an object side to an image side, a first lens element 710, an aperture stop 700, a second lens element 720, a third lens element 730, a fourth lens element 740, a fifth lens element 750, an IR-cut filter 760 and an image surface 770, wherein the photographing optical lens assembly has a total of five non-cemented lens elements (710-750) with refractive power.

The first lens element 710 with positive refractive power has an aspheric object-side surface 711 being concave in a paraxial region and an aspheric image-side surface 712 being convex in a paraxial region, and the first lens element 710 is made of plastic material.

The second lens element 720 with negative refractive power has an aspheric object-side surface 721 being convex in a paraxial region and an aspheric image-side surface 722 being concave in a paraxial region, the second lens element 720 is made of plastic material, and inflection points are formed on the object-side surface 721 and the image-side surface 722 of the second lens element 720.

The third lens element 730 with positive refractive power has an aspheric object-side surface 731 being concave in a paraxial region and an aspheric image-side surface 732 being convex in a paraxial region, and the third lens element 730 is made of plastic material.

The fourth lens element 740 with negative refractive power has an aspheric object-side surface 741 being concave in a paraxial region and an aspheric image-side surface 742 being convex in a paraxial region, the fourth lens element 740 is made of plastic material, and inflection points are formed on the object-side surface 741 and the image-side surface 742 of the fourth lens element 740.

The fifth lens element 750 with positive refractive power has an aspheric object-side surface 751 being convex in a paraxial region and an aspheric image-side surface 752 being concave in a paraxial region, the fifth lens element 750 is made of plastic material, and inflection points are formed on the image-side surface 752 of the fifth lens element 750.

The IR-cut filter 760 is made of glass and located between the fifth lens element 750 and the image surface 770, and will not affect the focal length of the photographing optical lens assembly.

The detailed optical data of the 7th embodiment are shown in Table 13 and the aspheric surface data are shown in Table 14 below.

TABLE 13

7th Embodiment
f = 3.32 mm, Fno = 2.50, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.060 | | | | |
| 2 | Lens 1 | −62.500 | ASP | 0.488 | Plastic | 1.535 | 56.3 | 2.48 |
| 3 | | −1.299 | ASP | 0.129 | | | | |
| 4 | Lens 2 | 6.986 | ASP | 0.190 | Plastic | 1.639 | 23.5 | −3.49 |
| 5 | | 1.673 | ASP | 0.285 | | | | |
| 6 | Lens 3 | −17.749 | ASP | 0.521 | Plastic | 1.544 | 55.9 | 11.10 |
| 7 | | −4.553 | ASP | 0.445 | | | | |
| 8 | Lens 4 | −0.819 | ASP | 0.300 | Plastic | 1.544 | 55.9 | −65.86 |
| 9 | | −0.947 | ASP | 0.094 | | | | |
| 10 | Lens 5 | 0.954 | ASP | 0.560 | Plastic | 1.544 | 55.9 | 9.72 |
| 11 | | 0.923 | ASP | 0.800 | | | | |
| 12 | IR-cut filter | Plano | | 0.300 | Glass | 1.517 | 64.2 | — |
| 13 | | Plano | | 0.762 | | | | |
| 14 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | −1.0000E+00 | −8.9271E+00 | −3.0000E+01 | −9.7711E+00 | 5.0000E+00 |
| A4 = | −1.5337E−01 | −2.1541E−01 | 2.0004E−01 | 8.2815E−02 | −1.0337E−01 |
| A6 = | −8.5482E−02 | −8.4831E−02 | −6.4269E−01 | −1.1085E−01 | 1.8312E−01 |
| A8 = | −8.0446E−02 | 1.4595E−01 | 1.0102E+00 | −4.7754E−03 | −2.4493E−01 |
| A10 = | −4.7284E−02 | −2.0255E−01 | −1.2664E+00 | −1.2335E−02 | 3.8288E−01 |
| A12 = | −2.4943E−02 | −3.0737E−01 | 1.1034E+00 | 1.0903E−01 | −4.0292E−01 |
| A14 = | −7.2963E−02 | 8.6609E−01 | −5.1044E−01 | −9.8784E−02 | 2.1077E−01 |
| A16 = | −1.7997E−01 | −5.7840E−01 | 8.3011E−02 | 2.6846E−02 | −4.0865E−02 |

| Surface # | 7 | 8 | 9 | 10 | 11 |
|---|---|---|---|---|---|
| k = | 6.9576E+00 | −3.0062E+00 | −1.4154E+00 | −2.7163E+00 | −2.8210E+00 |
| A4 = | −4.8542E−02 | 3.3744E−01 | 2.2405E−01 | −1.0280E−01 | −6.2627E−02 |
| A6 = | 1.1025E−01 | −4.6245E−01 | −1.8438E−01 | 2.8994E−02 | 2.7808E−03 |
| A8 = | −1.6923E−01 | 5.2033E−01 | 1.4812E−01 | −2.0735E−02 | 3.8755E−03 |
| A10 = | 9.7321E−02 | −4.3010E−01 | −6.9064E−02 | 1.2194E−02 | −1.5893E−03 |
| A12 = | −2.0069E−02 | 2.2436E−01 | 1.8600E−02 | −4.2675E−03 | 2.6678E−04 |
| A14 = | −6.4360E−03 | −6.6665E−02 | −2.3544E−03 | 7.9242E−04 | −2.0661E−05 |
| A16 = | 4.3233E−03 | 8.6938E−03 | 8.3553E−05 | −5.8693E−05 | 5.6292E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.32 | R10/f4 | −0.01 |
| Fno | 2.50 | f3/f1 | 4.48 |
| HFOV [deg.] | 41.4 | \|1/SF2\| + \|1/SF4\| + \|1/SF5\| | 0.70 |
| (V2 + V4)/V5 | 1.42 | Y11/Y52 | 0.30 |
| T12/T23 | 0.45 | Yc52/R1 | −0.03 |
| (T12 + T45)/(T23 + T34) | 0.31 | Log(R1/f4) | −0.02 |
| CT4/CT5 | 0.54 | SD/TD | 1.02 |
| (CT1 + CT2 + CT4)/(CT3 + CT5) | 0.90 | TL/ImgH | 1.62 |
| (R1 + R2)/(R1 − R2) | 1.04 | | |

8th Embodiment

Figure 8A:
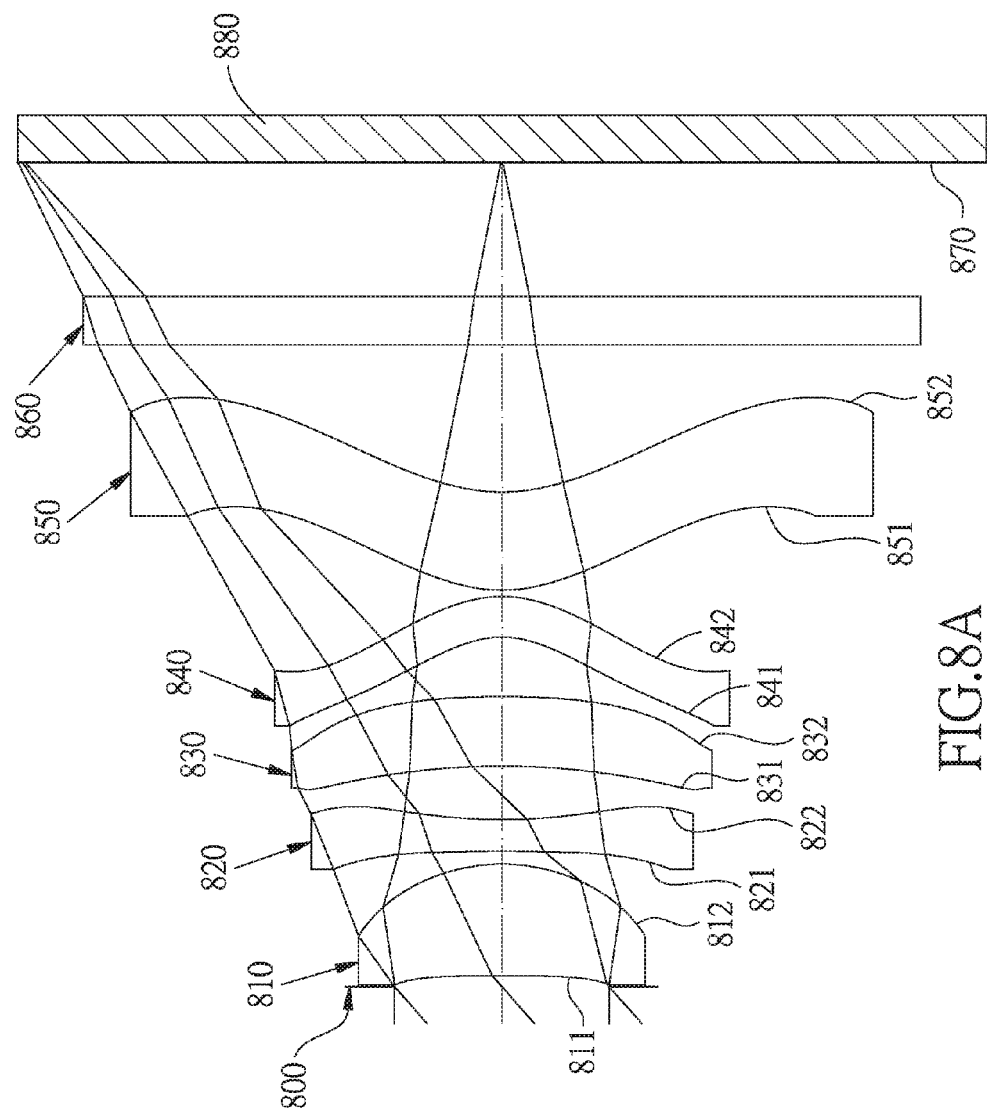
FIG. 8A is a schematic view of an imaging device according to the 8th embodiment of the present disclosure.
Figure 8B:
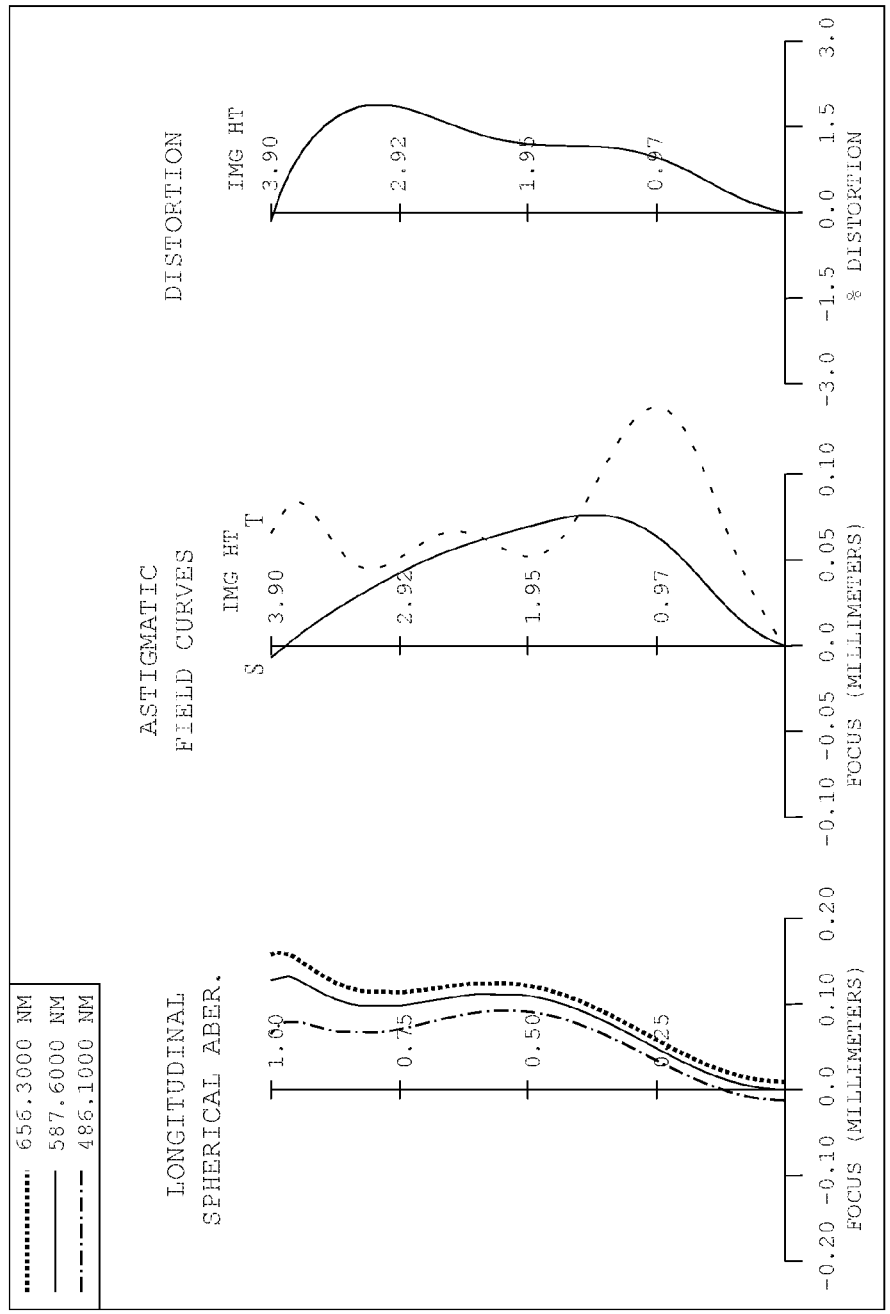
FIG. 8B shows spherical aberration curves, astigmatic field curves and a distortion curve of the imaging device according to the 8th embodiment.

FIG. 8A is a schematic view of an imaging device according to the 8th embodiment of the present disclosure. FIG. 8B shows, in order from left to right, spherical aberration curves, astigmatic field curves and a distortion curve of the imaging unit according to the 8th embodiment.

In FIG. 8A, the imaging device includes the photographing optical lens assembly (not otherwise herein labeled) of the present disclosure and an image sensor 880. The photographing optical lens assembly comprises, in order from an object side to an image side, a first lens element 810, an aperture stop 800, a second lens element 820, a third lens element 830, a fourth lens element 840, a fifth lens element 850, an IR-cut filter 860 and an image surface 870, wherein the photographing optical lens assembly has a total of five non-cemented lens elements (810-850) with refractive power.

The first lens element 810 with positive refractive power has an aspheric object-side surface 811 being concave in a paraxial region and an aspheric image-side surface 812 being convex in a paraxial region, and the first lens element 810 is made of glass material.

The second lens element 820 with negative refractive power has an aspheric object-side surface 821 being concave in a paraxial region and an aspheric image-side surface 822 being concave in a paraxial region, the second lens element 820 is made of plastic material, and inflection points are formed on the object-side surface 821 and the image-side surface 822 of the second lens element 820.

The third lens element 830 with negative refractive power has an aspheric object-side surface 831 being concave in a paraxial region and an aspheric image-side surface 832 being convex in a paraxial region, and the third lens element 830 is made of plastic material.

The fourth lens element 840 with negative refractive power has an aspheric object-side surface 841 being concave in a paraxial region and an aspheric image-side surface 842 being convex in a paraxial region, the fourth lens element 840 is made of plastic material, and inflection points are formed on the object-side surface 841 and the image-side surface 842 of the fourth lens element 840.

The fifth lens element 850 with positive refractive power has an aspheric object-side surface 851 being convex in a paraxial region and an aspheric image-side surface 852 being concave in a paraxial region, the fifth lens element 850 is made of plastic material, and inflection points are formed on the image-side surface 852 of the fifth lens element 850.

The IR-cut filter 860 is made of glass and located between the fifth lens element 850 and the image surface 870, and will not affect the focal length of the photographing optical lens assembly.

The detailed optical data of the 8th embodiment are shown in Table 15 and the aspheric surface data are shown in Table 16 below.

TABLE 15

8th Embodiment
f = 4.36 mm, Fno = 2.50, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.088 | | | | |
| 2 | Lens 1 | −76.171 | ASP | 0.910 | Glass | 1.548 | 45.7 | 2.69 |
| 3 | | −1.454 | ASP | 0.106 | | | | |
| 4 | Lens 2 | −9.135 | ASP | 0.256 | Plastic | 1.639 | 23.5 | −4.93 |
| 5 | | 4.868 | ASP | 0.435 | | | | |
| 6 | Lens 3 | −6.694 | ASP | 0.566 | Plastic | 1.535 | 56.3 | −69.34 |
| 7 | | −8.409 | ASP | 0.485 | | | | |
| 8 | Lens 4 | −0.772 | ASP | 0.330 | Plastic | 1.583 | 30.2 | −10.91 |
| 9 | | −1.017 | ASP | 0.050 | | | | |
| 10 | Lens 5 | 1.230 | ASP | 0.800 | Plastic | 1.544 | 55.9 | 5.94 |
| 11 | | 1.532 | ASP | 1.200 | | | | |
| 12 | IR-cut filter | Plano | | 0.390 | Glass | 1.517 | 64.2 | — |
| 13 | | Plano | | 1.094 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | −1.0000E+00 | −5.7707E+00 | 1.9426E+01 | −1.3032E+01 | −9.9341E+00 |
| A4 = | −8.4340E−02 | −1.3484E−01 | 1.0049E−01 | 3.6964E−02 | −3.3952E−02 |
| A6 = | −1.2416E−02 | −3.9245E−03 | −1.7832E−01 | −3.5234E−02 | 4.2699E−02 |
| A8 = | −1.4523E−02 | 2.8068E−02 | 1.6035E−01 | −2.3998E−03 | −4.0126E−02 |
| A10 = | −3.1299E−02 | −2.5902E−02 | −1.1823E−01 | −1.1517E−03 | 3.6000E−02 |
| A12 = | −1.3918E−03 | −1.7151E−02 | 6.1569E−02 | 6.3657E−03 | −2.2464E−02 |
| A14 = | −2.4090E−03 | 2.8596E−02 | −1.6853E−02 | −3.2647E−03 | 7.0217E−03 |
| A16 = | −3.5160E−03 | −1.1300E−02 | 1.6218E−03 | 5.2449E−04 | −8.0346E−04 |

| Surface # | 7 | 8 | 9 | 10 | 11 |
|---|---|---|---|---|---|
| k = | 1.7678E+01 | −2.1552E+00 | −1.4941E+00 | −3.1281E+00 | −2.7620E+00 |
| A4 = | −5.0537E−02 | 1.5993E−01 | 1.0540E−01 | −1.5762E−02 | −1.0079E−02 |
| A6 = | 3.8403E−02 | −1.2584E−01 | −4.8738E−02 | 4.0741E−03 | −1.8375E−03 |
| A8 = | −2.6393E−02 | 8.3263E−02 | 2.3630E−02 | −3.1517E−03 | 7.4769E−04 |
| A10 = | 8.9427E−03 | −4.0406E−02 | −6.5393E−03 | 1.1537E−03 | −1.4321E−04 |
| A12 = | −1.2126E−03 | 1.2522E−02 | 1.0400E−03 | −2.3771E−04 | 1.4726E−05 |
| A14 = | −2.3170E−04 | −2.2101E−03 | −7.8920E−05 | 2.6185E−05 | −7.2422E−07 |
| A16 = | 8.7517E−05 | 1.6560E−04 | −4.8867E−07 | −1.1858E−06 | 1.0495E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | |
|---|---|
| f [mm] | 4.36 |
| Fno | 2.50 |
| HFOV [deg.] | 41.4 |
| (V2 + V4)/V5 | 0.96 |
| T12/T23 | 0.24 |
| (T12 + T45)/(T23 + T34) | 0.17 |
| CT4/CT5 | 0.41 |

| 8th Embodiment | |
|---|---|
| R10/f4 | −0.14 |
| f3/f1 | −25.75 |
| \|1/SF2\| + \|1/SF4\| + \|1/SF5\| | 3.53 |
| Y11/Y52 | 0.29 |
| Yc52/R1 | −0.03 |
| Log(R1/f4) | 0.84 |
| SD/TD | 1.02 |
| (CT1 + CT2 + CT4)/(CT3 + CT5) | 1.10 |
| TL/ImgH | 1.70 |
| (R1 + R2)/(R1 − R2) | 1.04 |

9th Embodiment

FIG. 10 is a schematic view of a mobile terminal 10 according to the 9th embodiment of the present disclosure. The mobile terminal 10 of the 9th embodiment is a smart phone, wherein the mobile terminal 10 includes an imaging device 11. The imaging device 11 includes a photographing optical lens assembly (not otherwise herein labeled) according to the present disclosure and an image sensor (not otherwise herein labeled), wherein the image sensor is disposed on or near an image surface of the photographing optical lens assembly.

10th Embodiment

FIG. 11 is a schematic view of a mobile terminal 20 according to the 10th embodiment of the present disclosure. The mobile terminal 20 of the 10th embodiment is a tablet computer, wherein the mobile terminal 20 includes an imaging device 21. The imaging device 21 includes a photographing optical lens assembly (not otherwise herein labeled) according to the present disclosure and an image sensor (not otherwise herein labeled), wherein the image sensor is disposed on or near an image surface of the photographing optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
   a first lens element;
   a second lens element, both of an object-side surface and an image-side surface of the second lens element being aspheric;
   a third lens element, both of an object-side surface and an image-side surface of the third lens element being aspheric;
   a fourth lens element having negative refractive power, both of an object-side surface and an image-side surface of the fourth lens element being aspheric; and
   a fifth lens element having an image-side surface being concave in a paraxial region thereof, at least one inflection point on the image-side surface, and both of an object-side surface and the image-side surface of the fifth lens element being aspheric;
   wherein the photographing optical lens assembly has a total of five lens elements, a curvature radius of an object-side surface of the first lens element is R1, a curvature radius of an image-side surface of the first lens element is R2, an axial distance between the object-side surface of the first lens element and an image surface is TL, a maximum image height of the photographing optical lens assembly is ImgH, and the following conditions are satisfied:

$1.00 < (R1+R2)/(R1-R2) < 3.00$; and $TL/\mathrm{Img}H < 2.5$.

2. The photographing optical lens assembly of claim 1, wherein a curvature radius of the image-side surface of the fifth lens element is R10, a focal length of the fourth lens element is f4, and the following condition is satisfied:

$-2.0 < R10/f4 < 0$.

3. The photographing optical lens assembly of claim 2, wherein the object-side surface of the fifth lens element is convex in a paraxial region thereof.

4. The photographing optical lens assembly of claim 2, wherein the third lens element has positive refractive power.

5. The photographing optical lens assembly of claim 2, wherein the object-side surface of the second lens element is convex in a paraxial region thereof.

6. The photographing optical lens assembly of claim 2, wherein half of a maximal field of view of the photographing optical lens assembly is HFOV, and the following condition is satisfied:

35 degrees < HFOV < 55 degrees.

7. The photographing optical lens assembly of claim 2, wherein the curvature radius of the image-side surface of the fifth lens element is R10, the focal length of the fourth lens element is f4, and the following condition is satisfied:

$-0.80 < R10/f4 < 0$.

8. The photographing optical lens assembly of claim 1, wherein the photographing optical lens assembly further includes an aperture stop, an axial distance between the aperture stop and the image-side surface of the fifth lens element is SD, an axial distance between the object-side surface of the first lens element and the image-side surface of the fifth lens element is TD, and the following condition is satisfied:

$0.85 < SD/TD < 1.2$.

9. The photographing optical lens assembly of claim 8, wherein the image-side surface of the third lens element is convex in a paraxial region thereof.

10. The photographing optical lens assembly of claim 8, wherein the first, second, third, fourth and fifth lens elements are single and non-cemented lens elements, the axial distance between the object-side surface of the first lens element and the image surface is TL, the maximum image height of the photographing optical lens assembly is ImgH, and the following condition is satisfied:

$TL/\mathrm{Img}H < 2.0$.

11. The photographing optical lens assembly of claim 8, wherein one of the object-side and the image-side surfaces of the second lens element has at least one inflection point.

12. The photographing optical lens assembly of claim 1, wherein the image-side surface of the second lens element is concave in a paraxial region thereof.

13. The photographing optical lens assembly of claim 1, wherein the object-side surface of the fourth lens element is concave in a paraxial region thereof and the image-side surface of the fourth lens element is convex in a paraxial region thereof.

14. The photographing optical lens assembly of claim 1, wherein a curvature radius of the object-side surface of the second lens element is R3, a curvature radius of the image-side surface of the second lens element is R4, a curvature radius of the object-side surface of the fourth lens element is R7, a curvature radius of the image-side surface of the fourth lens element is R8, a curvature radius of the object-side surface of the fifth lens element is R9, a curvature radius of the image-side surface of the fifth lens element is R10, a shape factor of the second lens element is SF2, a shape factor of the fourth lens element is SF4, a shape factor of the fifth lens element is SF5, and the following conditions are satisfied:

$SF2 = (R3+R4)/(R3-R4)$;

$SF4 = (R7+R8)/(R7-R8)$;

$SF5 = (R9+R10)/(R9-R10)$; and $0 < |1/SF2| + |1/SF4| + |1/SF5| < 0.90$.

15. An imaging device, comprising:
the photographing optical lens assembly of claim 2; and
an image sensor, wherein the image sensor is disposed on an image surface of the photographing optical lens assembly.

16. A mobile electronic terminal, comprising:
the imaging device of claim 15.

17. A photographing optical lens assembly comprising, in order from an object side to an image side:
a first lens element;
a second lens element, both of an object-side surface and an image-side surface of the second lens element being aspheric;
a third lens element, both of an object-side surface and an image-side surface of the third lens element being aspheric;
a fourth lens element with negative refractive power having an object-side surface being concave in a paraxial region thereof and an image-side surface being convex in a paraxial region thereof, both of the object-side surface and the image-side surface of the fourth lens element being aspheric; and
a fifth lens element having an image-side surface being concave in a paraxial region thereof, at least one inflection point on the image-side surface, and both of an object-side surface and the image-side surface of the fifth lens element being aspheric;
wherein an axial distance between the third lens element and the fourth lens element is larger than an axial distance between the fourth lens element and the fifth lens element, the photographing optical lens assembly has a total of five lens elements, a curvature radius of an object-side surface of the first lens element is R1, a curvature radius of an image-side surface of the first lens element is R2, and the following condition is satisfied:

$1.00<(R1+R2)/(R1-R2)<3.00.$

18. The photographing optical lens assembly of claim 17, wherein the photographing optical lens assembly further includes an aperture stop, the aperture stop is located closer to the object side than the second lens element to the object side.

19. The photographing optical lens assembly of claim 18, wherein a central thickness of the fourth lens element is CT4, a central thickness of the fifth lens element is CT5, and the following condition is satisfied:

$0<CT4/CT5<0.60.$

20. The photographing optical lens assembly of claim 17, wherein the image-side surface of the second lens element is concave in a paraxial region thereof.

21. The photographing optical lens assembly of claim 17, wherein the first, second, third, fourth and fifth lens elements are single and non-cemented lens elements, and one of the object-side and the image-side surfaces of the fourth lens element has at least one inflection point.

22. The photographing optical lens assembly of claim 17, wherein the curvature radius of the object-side surface of the first lens element is R1, the curvature radius of the image-side surface of the first lens element is R2, and the following condition is satisfied:

$1.00<(R1+R2)/(R1-R2)<2.00.$

23. The photographing optical lens assembly of claim 17, wherein a central thickness of the first lens element is CT1, a central thickness of the second lens element is CT2, a central thickness of the third lens element is CT3, a central thickness of the fourth lens element is CT4, a central thickness of the fifth lens element is CT5, and the following condition is satisfied:

$(CT1+CT2+CT4)/(CT3+CT5)<0.70.$

24. The photographing optical lens assembly of claim 17, wherein a focal length of the first lens element is f1, a focal length of the third lens element is f3, and the following condition is satisfied:

$0<f3/f1<1.5.$

25. The photographing optical lens assembly of claim 17, wherein an axial distance between the object-side surface of the first lens element and an image surface is TL, a maximum image height of the photographing optical lens assembly is ImgH, and the following condition is satisfied:

$TL/ImgH<2.5.$

26. The photographing optical lens assembly of claim 17, wherein an effective radius of the object-side surface of the first lens element is Y11, an effective radius of the image-side surface of the fifth lens element is Y52, and the following condition is satisfied:

$0<Y11/Y52<0.60.$

27. An imaging device, comprising:
the photographing optical lens assembly of claim 17; and
an image sensor, wherein the image sensor is disposed on an image surface of the photographing optical lens assembly.

28. A mobile electronic terminal, comprising:
the imaging device of claim 27.

* * * * *